US008457548B2

(12) United States Patent
Takada et al.

(10) Patent No.: US 8,457,548 B2
(45) Date of Patent: Jun. 4, 2013

(54) RELAY DEVICE, COMMUNICATION SYSTEM AND COMMUNICATION METHOD

(75) Inventors: Hiroaki Takada, Nagoya (JP); Ryo Kurachi, Nagoya (JP); Yukihiro Miyashita, Yokkaichi (JP)

(73) Assignees: National University Corporation Nagoya University, Nagoya (JP); Autonetworks Technologies Ltd, Mie (JP); Sumitomo Wiring Systems, Ltd, Mie (JP); Sumitomo Electric Industries, Inc., Osaka (JP)

( * ) Notice: Subject to any disclaimer, the term of this patent is extended or adjusted under 35 U.S.C. 154(b) by 351 days.

(21) Appl. No.: 12/999,504

(22) PCT Filed: Jul. 10, 2009

(86) PCT No.: PCT/JP2009/003252
§ 371 (c)(1),
(2), (4) Date: Dec. 16, 2010

(87) PCT Pub. No.: WO2010/004767
PCT Pub. Date: Jan. 14, 2010

(65) Prior Publication Data
US 2011/0105017 A1   May 5, 2011

(30) Foreign Application Priority Data
Jul. 10, 2008   (JP) .................................. 2008-180685

(51) Int. Cl.
*H04B 7/14*   (2006.01)

(52) U.S. Cl.
USPC ................... 455/7; 455/11.1; 455/15; 455/18

(58) Field of Classification Search
USPC ............. 455/18, 7, 11.1, 14, 15, 16, 24, 13.1, 455/412.1, 412.2; 340/425.2, 425.1; 370/389; 707/705
See application file for complete search history.

(56) References Cited

U.S. PATENT DOCUMENTS 6,754,212 B1 * 6/2004 Terada et al. ................. 370/389
2010/0281010 A1 * 11/2010 Yamamoto .................... 707/705

FOREIGN PATENT DOCUMENTS

| JP | A 2001-319012 | 11/2001 |
| JP | A 2007-251828 | 9/2007 |
| JP | A 2007-300331 | 11/2007 |

OTHER PUBLICATIONS

International Search Report issued in PCT/JP2009/003252, mailed Oct. 20, 2009. (with English-language translation).

\* cited by examiner

*Primary Examiner* — John J Lee
(74) *Attorney, Agent, or Firm* — Oliff & Berridge, PLC

(57) ABSTRACT

The relay devices store data received from an ECU connected to each of the relay devices in the first reception buffers, respectively. During a synchronizing period, the relay devices perform transmission and reception by mainline frames including attribute value groups mutually received from the ECUs. Data read out from the databases are transmitted to the ECUs. The databases are synchronized with one another only when the relay device receives the final frame from the relay device which received all the mainline frames and issues COMMIT.

19 Claims, 18 Drawing Sheets

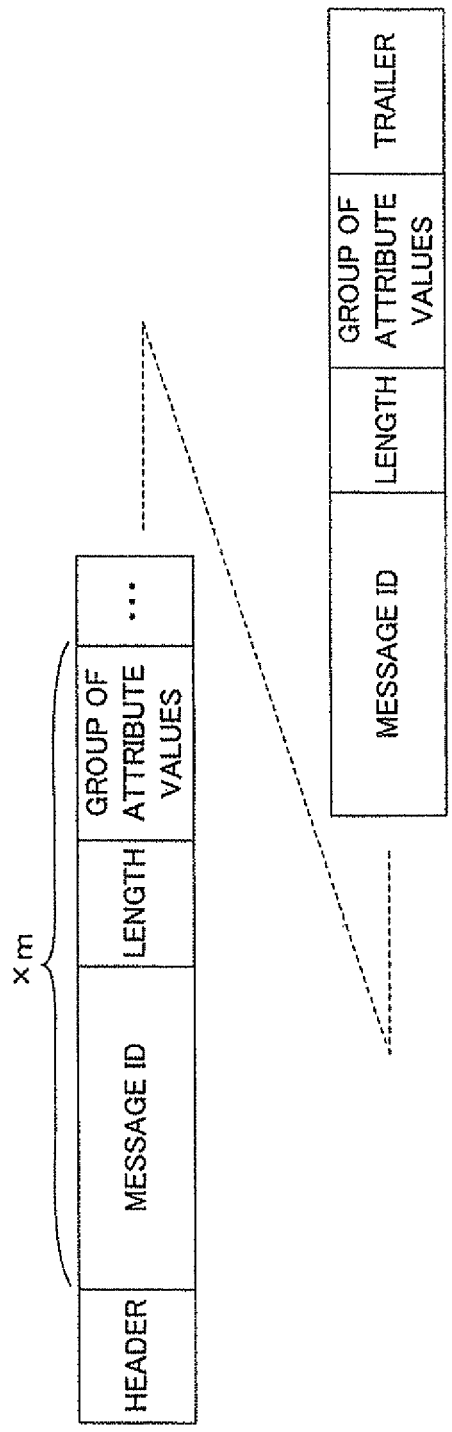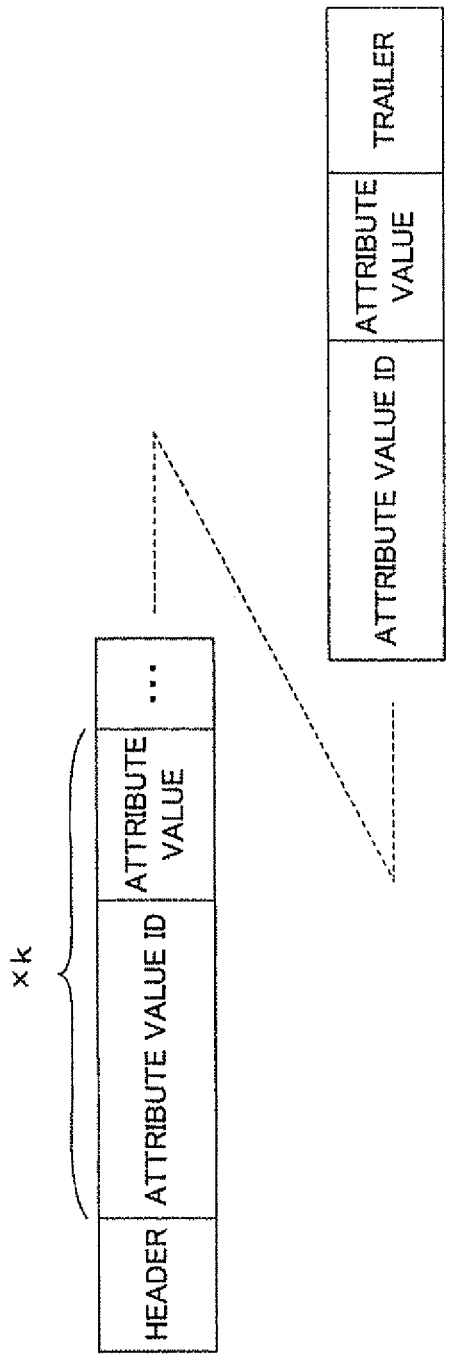
FIG. 4A
FIG. 4B

FIG. 5

| MESSAGE ID (CAN ID) | NUMBER OF ATTRIBUTE VALUES | 1 | | | | 2 | | | ⋮ |
|---|---|---|---|---|---|---|---|---|---|
| | | ATTRIBUTE VALUE ID | POSITION (ORDER) | LENGTH (BIT) | ATTRIBUTE VALUE ID | POSITION (ORDER) | LENGTH (BIT) | |
| 1 | 2 | 1 | 1 | 1 | 2 | 2 | 1 | ⋮ |
| 2 | 4 | 20 | 2 | 1 | 50 | 4 | 8 | ⋮ |
| 3 | n | 8 | 4 | 3 | 5 | n | 4 | ⋮ |
| 4 | 64 | 1 | 1 | 1 | 2 | 2 | 1 | ⋮ |
| ⋮ | ⋮ | ⋮ | ⋮ | ⋮ | ⋮ | ⋮ | ⋮ | |

NUMBER OF ATTRIBUTE VALUES

RELAY DEVICE, COMMUNICATION SYSTEM AND COMMUNICATION METHOD

This application is the national phase under 35 U.S.C. §371 of PCT International Application No. PCT/JP2009/003252 which has an International filing date of Jul. 10, 2009 and designated the United States of America.

BACKGROUND

1. Technical Field

The present invention relates to a communication system in which data is transmitted and received among a plurality of communication devices. More specifically, the present invention relates to a relay device relaying transmission and reception of data among communication devices, the relay device being able to shorten time required for exchange of data when data is exchanged between a plurality of relay devices while further maintaining the data held by the relay devices to be identical, and also relates to a communication system including the relay device and to a communication method.

2. Description of Related Art

In recent years, a system in which a plurality of communication devices are connected together to mutually exchange data and to perform a wide variety of processing in cooperation with one another while each communication device is assigned a function has been utilized in various fields. In the field of vehicle-mounted LAN (Local Area Network) mounted on vehicles, ECUs (Electronic Control Units) are used as communication devices to cause each ECU to perform specialized processing and exchange data with one another, thereby implementing various functions as a system.

As the function of each communication device is specialized while the number of functions to be performed by each communication device is increased, the number and types of communication devices connected to a communication medium are also increased. Moreover, various functions are expected for the system, which generates the need for each communication device to share data and cooperate with one another, increasing the amount of data to be transmitted.

Increase of the amount of data transmitted and received through a communication line causes delay or loss of data as a result of collision. Significant delay or loss of data may be fatal to the driver assistant function such as brake control by ECU.

It is therefore general to employ a structure in which a plurality of communication lines are used while ECU is connected to each of the different communication lines. This is to avoid wasteful use of communication lines by collecting ECUs that share data in common. Moreover, to effectively use the communication lines to address the increase in the types of ECUs, such a structure may also be employed that ECUs are separated by the types of data to be transmitted and received, and connected to the communication lines with different communication speed. In these structures, different communication lines are connected with each other by a relay device that controls transmission and reception of data.

Even if the communication devices are divided into groups, the amount of data transmitted to communication lines is not reduced with the structure in which all the data required for control of each communication device is transferred via a relay device. Therefore, such a technique has been disclosed in Japanese Patent Application Laid-open No. 2007-300331 that the data received from each communication device is once stored in a database from which the data required for each communication is appropriately read out to be transmitted, and the data stored in a database is transmitted and received among devices each having a database to share the database.

SUMMARY

By the technique disclosed in Japanese Patent Application Laid-open No. 2007-300331, communication devices are divided into a plurality of groups and a device having a database relays the transmission and reception of data between different groups to share the database, which can reduce delay. When such a structure that a device having a database relays transmission and reception of data between communication devices in different groups is employed, it is desirable to reduce the amount of communication between relay devices having databases in the case where even faster relay processing is required.

The present invention has been contrived in view of above circumstances. An object of the invention is to provide a relay device that, when data is exchanged between relay devices having databases, can reduce the amount of communication by transmitting and receiving only appropriately-combined numerical information among data including a pair of identification information and numerical information corresponding to the identification information, and can also maintain the databases in the relay devices to be identical by not updating a database unless a notice of determination is received at each device, and to provide a communication system including the relay device and a communication method.

A relay device according to a first aspect is a relay device connected to an external device periodically transmitting and receiving data including numerical information and identification information of the numerical information, the relay device comprising first communication means for performing transmission and reception of data with the external device and means for storing data in a database, and transmitting data read out from the database to the external device through said first communication means to relay transmission and reception of data between external devices, characterized by further comprising: second communication means for communicating with another relay device; means for storing, each time data is received from the external device, numerical information of the received one or more data in a first buffer with respect to said database; means for reading out the numerical information stored in said first buffer and creating a data frame including the numerical information for a certain period of time; means for transmitting the created data frame through said second communication means; means for storing, when a data frame is received from another relay device, the received data frame or the numerical information included in the data frame in a second buffer with respect to said database; update means for updating the numerical information of data in the database with the numerical information in said first and second buffers; and means for judging whether or not a notice of determination indicating determination of data to be stored in the database is received from another relay device, wherein said update means updates when it is judged that the notice of determination is received.

A relay device according to a second aspect is characterized in that, when it is judged that the notice of determination is not received, said update means updates at a time when transmission information indicating that said notice of determination is transmitted is received from another relay device.

A relay device according to a third aspect is a relay device connected to an external device periodically transmitting and receiving data including numerical information and identification information of the numerical information, the relay device comprising first communication means for performing transmission and reception of data with the external device and means for storing data in a database, and transmitting data read out from the database to the external device through said first communication means to relay transmission and reception of data between external devices, characterized by further comprising: second communication means for communicating with another relay device; means for storing, each time data is received from the external device, numerical information of the received one or more data in a first buffer with respect to said database; means for reading out the numerical information stored in said first buffer and creating a data frame including the numerical information for a certain period of time; means for transmitting the created data frame through said second communication means to another relay device; means for storing, when a data frame is received from another relay device, the received data frame or the numerical information included in the data frame in a second buffer with respect to said database; judgment means for judging whether or not data to be stored in the database is to be determined; update means for updating, when said judgment means judges that the data is to be determined, the numerical information of data in the database with the numerical information in said first and second buffers; and means for transmitting, when said judgment means judges that the data is to be determined, a notice of determination indicating determination of data through said second communication means to another relay device.

A relay device according to a fourth aspect is, in the third aspect, characterized by further comprising notice information transmitting means for transmitting, through said second communication means, notice information indicating whether or not said notice of determination was transmitted in a preceding period, wherein when said judgment means judges that the data is to be determined, said notice information transmitting means transmits, in a subsequent period, notice information indicating that said notice of determination is transmitted.

A relay device according to a fifth aspect is, in the third aspect, characterized in that, when said judgment means judges that the data is not to be determined, said notice information transmitting means transmits, in the subsequent period, notice information indicating that said notice of determination is not transmitted, and a data frame created in the preceding period is retransmitted.

A communication system according to a sixth aspect is a communication system comprising a plurality of communication device groups each constructed by a plurality of communication devices periodically transmitting and receiving data including numerical information and identification information of the numerical information, and a plurality of relay devices connected with each other to relay transmission and reception of data among the communication devices, one or more of the relay devices being connected to each of the plurality of communication device groups, each relay device including: first communication means for performing transmission and reception of data with the communication device; means for storing data in a database; and means for transmitting data read out from the database to the communication device through said first communication means, characterized in that each of the relay devices includes: second communication means for communicating with another relay device; means for storing, each time data is received from the communication device connected to the relay device, numerical information of the received one or more data in a first buffer with respect to said database; means for reading out the numerical information stored in said first buffer and creating a data frame including the numerical information for a certain period of time; means for transmitting the created data frame through said second communication means to another relay device; means for storing, when a data frame is received from another relay device, the received data frame or numerical information included in the data frame in a second buffer with respect to said database; and update means for updating numerical information of data in the database with numerical information in said first and second buffers; and that a specified relay device in the relay devices includes: judgment means for judging whether or not data to be stored in the database is to be determined; and means for transmitting, when the judgment means judges that the data is to be determined, a notice of determination indicating determination of data through said second communication means to another relay device, wherein said update means updates when said judgment means judges that the data is to be determined; and that the relay device other than said specified relay device includes means for judging whether or not said notice of determination is received from the specified relay device, wherein said update means updates when it is judged that the notice of determination is received.

A communication system according to a seventh aspect is, in the sixth aspect, characterized in that the relay devices are connected in series, and said specified relay device is a relay device located at one end in the relay devices.

A communication system according to an eighth aspect is, in the seventh aspect, characterized in that the relay device located at an end in the relay devices opposite from said specified relay device waits transmission of the created data frame until data frames transmitted from all the other relay devices are received, and the other relay devices includes means for transferring, when a data frame is received from one of the neighboring relay devices through said second communication means, the data frame to another one of the neighboring relay devices.

A communication system according to a ninth aspect is, in the seventh or eighth aspect, characterized in that the judgment means of said specified relay device judges that data is to be determined, when data frames are received from all the other relay devices.

A communication method according to a tenth aspect is a communication method to be performed by a plurality of relay devices connected with each other, one or more of the relay devices being connected to each of a plurality of communication device groups constructed by a plurality of communication devices periodically transmitting and receiving data including numerical information and identification information of the numerical information, each of the relay devices receiving data from the communication device, storing data in a database, transmitting data read out from said database to the communication device, to relay transmission and reception of data between the communication devices, characterized in that each of the relay devices stores, each time data is received from the communication device connected to the relay device, numerical information of the received one or more data in a first buffer with respect to said database; reads out the numerical information stored in said first buffer and creates a data frame including the numerical information for a certain period of time; transmits the created data frame to another relay device; receives a data frame transmitted from another relay device; and stores the received data frame or numerical information included in the data frame in a second buffer with respect to said database, and that a specified relay device among the relay devices judges whether or not data to be stored in the database is to be determined; transmits a notice of determination indicating determination of data to another relay device when it is judged that the data is to be determined; and updates numerical information of data in the database with the numerical information in said first and second buffers when it is judged that the data is to be determined, and that the relay device other than said specified relay device judges whether or not said notice of determination is received from the specified relay device; and updates numerical information of data in the database with the numerical information in said first and second buffers when it is judged that the notice of determination is received.

In the present invention, when an external device (communication device) performs transmission and reception while data stored in databases in relay devices are exchanged, each of the relay devices transmits and receives a data frame including numerical information through the second communication means different from the first communication means for communicating with the external device, to exchange data. As the number of the types of data increases, the information length indicating identification information becomes longer. The total information length of identification information is further increased in accordance with the number of data exchanged between the relay devices. In the present invention, however, the communication amount is reduced, since transmission and reception of identification information for each data may be omitted in the transmission and reception between the relay devices. Moreover, each relay device temporarily stores data received from the external device and data transmitted and received between the relay devices in the first and second buffers with respect to its database. Each relay device does not update the database with the numerical information stored in the first and second buffers unless it receives a notice of determination indicating determination of data. When the notice of determination is received at the relay devices, databases are updated all at once.

In the present invention, the relay devices periodically create data frames and exchange them. When the relay device has not received a notice of determination from another relay device, the database is not updated. When transmission information indicating that the notice of determination was transmitted in the preceding period is received during the subsequent period, the database is updated with the numerical information received and stored in the first and second buffers in the preceding period. When the notice of determination has been transmitted, the database in another relay device may have already been updated. Thus, the relay device performs updating as quickly as possible to allow its database to have the same data as the database of another relay device. This can maintain the databases to be identical by recovering as quickly as possible even when the relay devices fail in exchange of data.

In the present invention, the relay devices periodically create data frames and exchange them. In doing so, when it is judged that data should not be determined because there is a possibility that the exchange of data frames failed and therefore data stored in the second buffers in the relay devices are not identical, the notice of determination is not transmitted. Here, transmission information indicating that the notice of determination has not been transmitted is transmitted. During the subsequent period, the data frame in the preceding period is retransmitted when each relay device newly creates a data frame and exchanges it with another relay device. Thus, each relay device can recognize that a database is not updated also in another relay device in the preceding period, so that it will not update the database until the notice of determination is received as in another relay device. This allows the databases to be kept identical.

In the present invention, the relay devices are connected in series. The relay device located at an end of the relay devices connected in series serves as a specified relay device which judges whether or not the data to be stored in the database should be determined. By the serial connection, transmission and reception are interrupted when they fail at even one point. The specified relay device located at one end can therefore recognize that the transmission and reception between any of the relay devices may have failed with high possibility by not receiving the data frame or various information to be received. The database can be updated when the transmission and reception succeeded among all the relay devices because the data is identical in the relay devices. When, however, the transmission and reception failed at even one point, it can be judged that the database should not be updated, since it is highly possible that the data to be transmitted has not arrived. This can maintain the databases to be identical.

In the present invention, the relay device, located at an end of the relay devices connected in series opposite from the specified relay device, does not transmit the data frame created by the relay device unless it receives data frames from all the relay devices other than itself, because the transmission and reception of data frames have failed at some point otherwise. Accordingly, the data frame from the relay device located at an end opposite from the specified relay device serves as acknowledge for the data frame from the specified relay device. This facilitates judgment of whether or not the transmission and reception of data frames among the relay devices are successful at any point. Moreover, effective transmission and reception of data frames can be performed.

In the present invention, the specified relay device located at one end of the relay devices connected in series can recognize that transmission and reception of data frames among the relay devices are successful at any point when all the data frames from the other relay devices have arrived. Here, the data is prepared in the relay devices, allowing the contents of the databases to be approximately identical even if the databases are updated in the relay devices. When even one of the data frames has not arrived, it means that the transmission and reception failed at some point. In such a case, it can be judged that the database should not be updated because the data to be transmitted has not arrived. This enables the databases to be kept identical.

According to the present invention, when a relay device exchanges the data in its database with another relay device to relay data between external devices (communication devices) in different groups, transmission of identification information corresponding to the numerical information of data included in the database may be omitted, so that the communication amount between the relay devices can be reduced. By reducing the communication amount in the relay devices, the time required for exchange of data in the databases of the relay devices can be shortened and thus the exchange can be completed at high speed. Moreover, each relay device does not update the database unless the notice of determination transmitted from another device is received. Therefore, each relay device does not update the database when exchange of data fails at a part of the relay devices, allowing the data between the external devices in different groups to be kept identical.

The above and further objects and features will more fully be apparent from the following detailed description with accompanying drawings.

BRIEF DESCRIPTION OF THE DRAWINGS

FIGS. 4A and 4B are explanatory views illustrating a format example of a mainline frame transmitted by a control section of a relay device constructing the vehicle-mounted communication system according to Embodiment 1.

FIG. 5 is an explanatory view illustrating an example of the contents of a correspondence table stored in a storage section of a relay device constructing the vehicle-mounted communication system according to Embodiment 1.

DETAILED DESCRIPTION

The present invention will specifically be described below with reference to the drawings illustrating the embodiments thereof. In the following embodiments, an example will be described where the communication system according to the present invention is applied to a vehicle-mounted communication system in which a plurality of ECUs (Electronic Control Units) performing transmission and reception of data are connected with each other.

Embodiment 1

Figure 1:
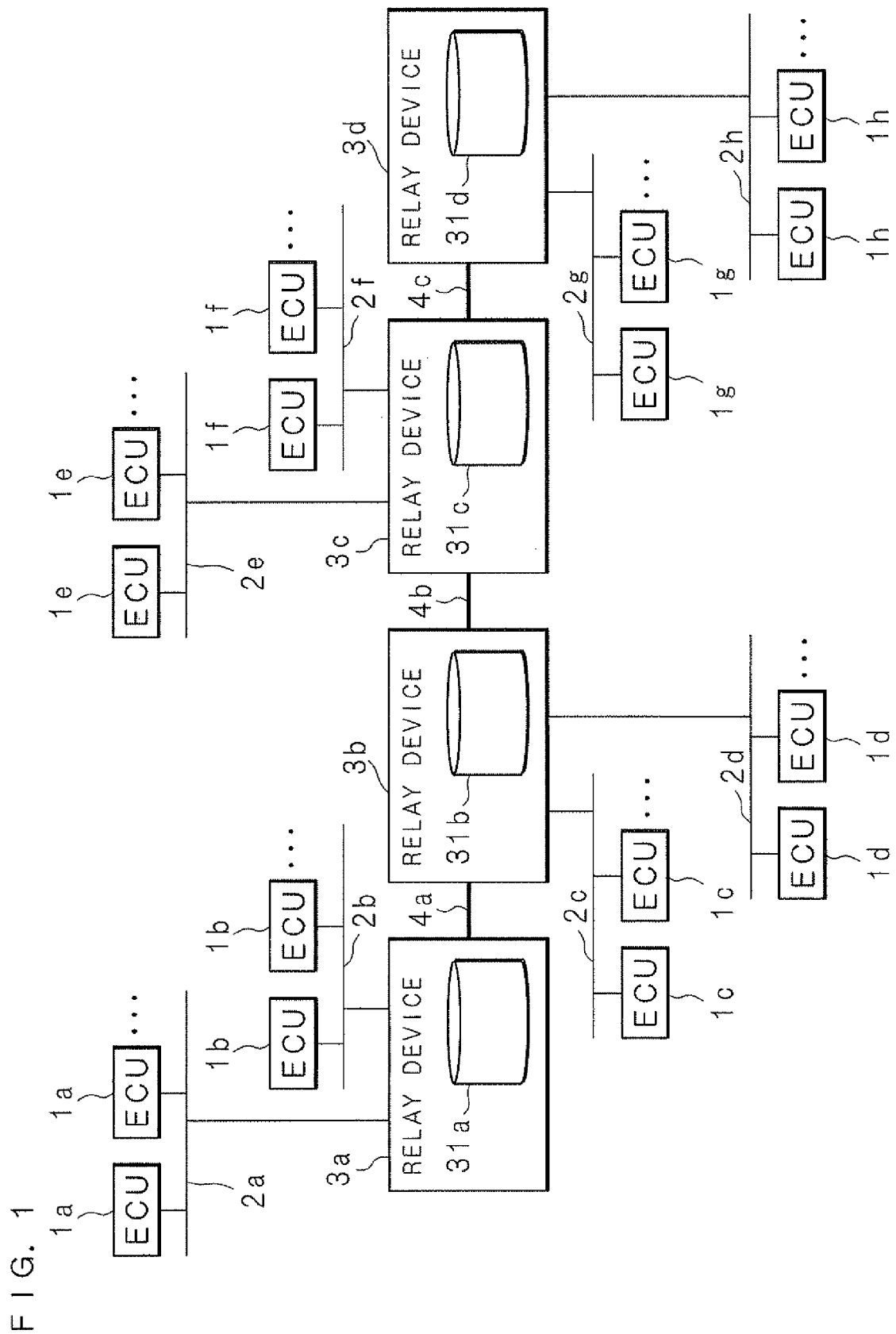
FIG. 1 is a configuration diagram illustrating the configuration of a vehicle-mounted communication system according to Embodiment 1.

FIG. 1 is a configuration diagram illustrating the configuration of a vehicle-mounted communication system according to Embodiment 1. The vehicle-mounted communication system is a communication device that transmits and receives data, and includes: ECUs $1a, \ldots, 1b, \ldots, 1c, \ldots, 1d, \ldots, 1e, \ldots, 1f, \ldots, 1g, \ldots$ and $1h, \ldots$ that form groups; communication lines $2a, 2b, 2c, 2d, 2e, 2f, 2g$ and $2h$ that connect the groups of ECUs $1a, \ldots, 1b, \ldots, 1c, \ldots, 1d, \ldots, 1e, \ldots, 1f, \ldots, 1g, \ldots$ and $1h, \ldots$, respectively; relay devices $3a, 3b, 3c$ and $3d$ that are connected to the communication lines $2a, 2b, 2c, 2d, 2e, 2f, 2g$ and $2h$ while relaying transmission and reception of data among ECUs $1a, \ldots, 1b, \ldots, 1c, \ldots, 1d, \ldots, 1e, \ldots, 1f, \ldots, 1g, \ldots$ and $1h, \ldots$; and communication lines $4a, 4b$ and $4c$ that connect the relay devices $3a, 3b, 3c$ and $3d$ with one another.

The vehicle-mounted communication system in Embodiment 1 constructs a mainline-type vehicle-mounted network that connects the plurality of groups of ECUs $1a, \ldots, 1b, \ldots, 1c, \ldots, 1d, \ldots, 1e, \ldots, 1f, \ldots, 1g, \ldots$ and $1h, \ldots$ via the relay devices $3a, 3b, 3c$ and $3d$ connected through the communication lines $4a, 4b$ and $4c$ which serve as main lines. In the description below, to clarify the explanation, the communication lines $2a, 2b, 2c, 2d, 2e, 2f, 2g$ and $2h$ will be referred to as branch lines $2a, 2b, 2c, 2d, 2e, 2f, 2g$ and $2h$, and the communication lines $4a, 4b$ and $4c$ will be referred to as main lines $4a, 4b$ and $4c$.

The ECUs $1a, 1a, \ldots$; the ECUs $1b, 1b, \ldots$; the ECUs $1c, 1c, \ldots$; and ECUs $1d, 1d, \ldots$ are connected to the branch lines $2a, 2b, 2c$ and $2d$, respectively. Moreover, The ECUs $1e, 1e, \ldots$; the ECUs $1f, 1f, \ldots$; the ECUs $1g, 1g, \ldots$; and ECUs $1h, 1h, \ldots$ are connected to the branch lines $2e, 2f, 2g$ and $2h$, respectively. Note that the ECUs $1a, \ldots, 1b, \ldots, 1c, \ldots, 1d, \ldots, 1e, \ldots, 1f, \ldots, 1g, \ldots$ and $1h, \ldots$ are connected via the branch lines $2a, 2b, 2c, 2d, 2e, 2f, 2g$ and $2h$ in a bus structure as illustrated in FIG. 1. This is because the ECUs $1a, \ldots, 1b, \ldots, 1c, \ldots, 1d, \ldots, 1e, \ldots, 1f, \ldots, 1g, \ldots$ and $1h, \ldots$ transmit and receive data in accordance with the CAN (Controller Area Network) protocol as will be described later. The connection configuration of the branch lines $2a, 2b, 2c, 2d, 2e, 2f, 2g$ and $2h$ is, however, not limited to the above and may be any other form such as star, daisy chain or the like.

For the connection configuration between the relay devices $3a, 3b, 3c$ and $3d$ via the main lines $4a, 4b$ and $4c$, daisy chain connection is employed. The relay devices $3a$ and $3b$ are connected via the main line $4a$. The relay devices $3b$ and $3c$ are connected via the main line $4b$. The relay devices $3c$ and $3d$ are connected via the main line $4c$. The relay devices $3a, 3b, 3c$ and $3d$ are provided with storage areas used as databases $31a, 31b, 31c$ and $31d$ (data storage means), respectively.

The relay device 3a basically stores the data transmitted from the ECUs 1a, 1a, . . . and 1b, 1b, . . . , which are connected via the branch lines 2a and 2b, in the database 31a. The relay device 3a transmits the data read out from the database 31a to the ECUs 1a, 1a, . . . and 1b, 1b, . . . . Moreover, the relay device 3a transmits the data received from the ECUs 1a, 1a, . . . and 1b, 1b, . . . to the other relay devices 3b, 3c and 3d while storing the data received from the other relay devices 3b, 3c and 3d in the database 31a. Likewise, the other relay devices 3b, 3c and 3d store the data received from the relay devices 3a, 3b, 3c and 3d in the databases 31b, 31c and 31d, respectively. Accordingly, the databases 31a, 31b, 31c and 31d are synchronized to have the same contents, allowing the ECUs 1a, . . . , 1b, . . . , 1c, . . . , 1d, . . . , 1e, . . . , 1f, . . . , 1g, . . . and 1h, . . . connected to the different branch lines 2a, 2b, 2c, 2d, 2e, 2f, 2g and 2h to use the same data.

Figure 2:
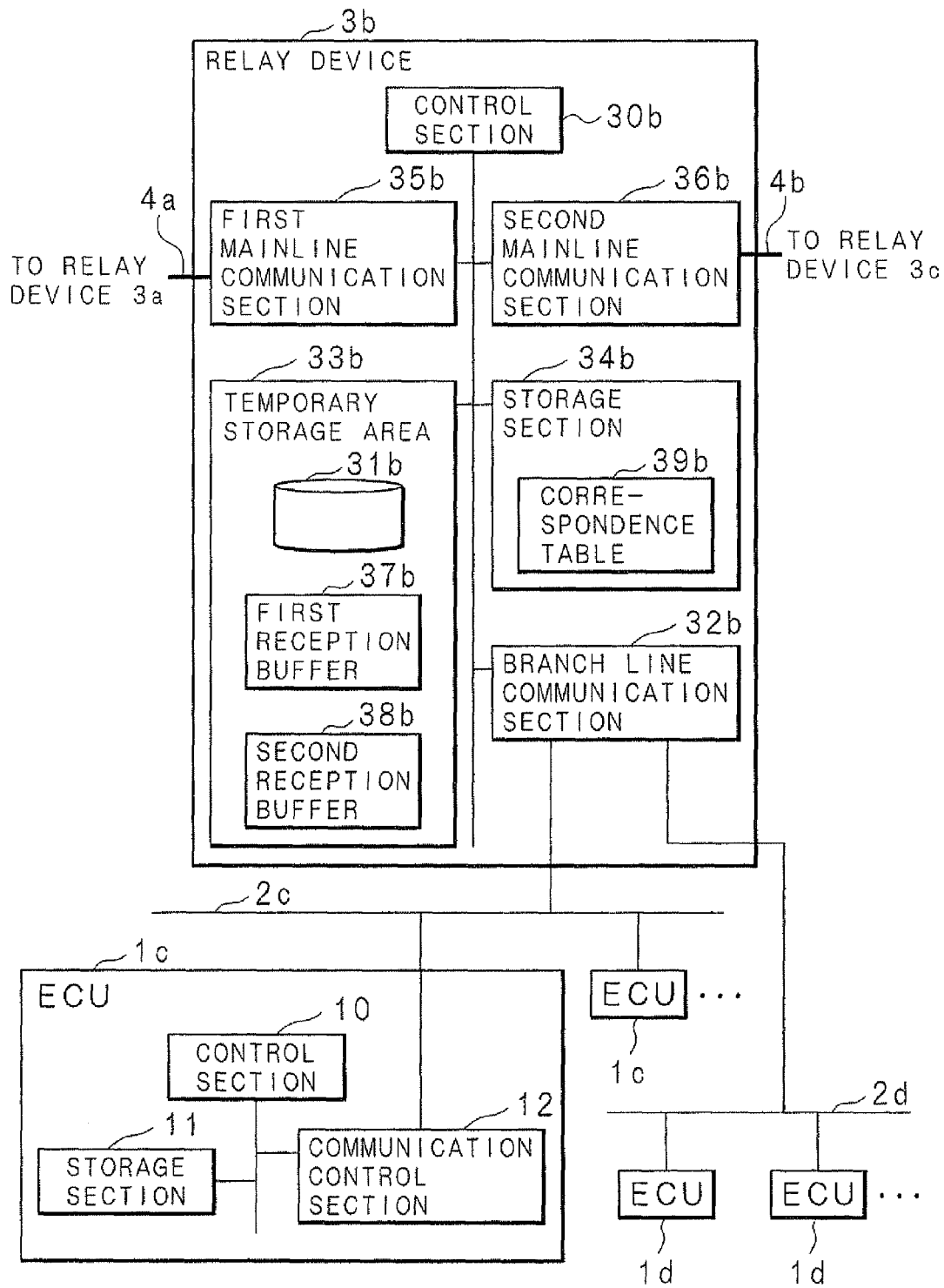
FIG. 2 is a block diagram illustrating the internal structure of an ECU and a relay device constructing the vehicle-mounted communication system according to Embodiment 1.

FIG. 2 is a block diagram illustrating the internal structure of the ECU 1c and the relay device 3b constructing the vehicle-mounted communication system according to Embodiment 1.

The ECU 1c includes a control section 10 controlling the operation of components, a storage section 11 storing data required for control and a communication control section 12 controlling communication with the branch line 2c. Since the other ECUs 1a, 1b, 1d, 1e, 1f, 1g and 1h have similar internal structures as the ECU 1c, detailed description thereof will not be repeated here.

The control section 10 in the ECU 1c is supplied with electric power from an electric-power supply device such as a battery, an alternator or the like of a vehicle, not illustrated, to control the operation of components.

The storage section 11 uses a volatile memory. The control section 10 temporarily stores, in the storage section 11, various types of information generated during the process, a measurement value indicated by a signal input from a sensor as will be described later, or data received from the relay device 3b.

The communication control section 12 has the function of a network controller to implement communication with the communication line 2c. The control section 10 in the ECU 1c transmits and receives data via the communication control section 12.

Thus configured ECUs 1a, . . . , 1b, . . . , 1c, . . . , 1d, . . . , 1e, . . . , 1f, . . . , 1g, . . . and 1h, . . . are devices capable of transmission of data including numerical information of various physical amounts such as a measurement value, a calculation value and a control value, or capable of control by a microcomputer such as an engine, a brake or the like. For example, the ECU 1c functions as ABS (Antilock Brake System) and is connected to a sensor (not illustrated) that detects the rotating speed of wheels (wheel speed). The ECU 1c controls the brake based on the wheel speed detected via the sensor at the time of braking the vehicle, while transmitting the measurement value of the wheel speed as data to the relay device 3b via the communication line 2c.

Note that the data transmitted from each of the ECUs 1a, . . . , 1b, . . . , 1c, . . . , 1d, . . . , 1e, . . . , 1f, . . . , 1g, . . . and 1h, . . . is constructed by a pair of an attribute value ID (Identification Data) identifying an attribute of data such as the wheel speed, temperature, angle or the like and its specific numerical information (attribute value). For example, the data indicating the wheel speed is formed by a pair of an attribute value ID "10," which is assigned to the wheel speed, and an attribute value "3000 (rpm: revolutions per minute)." Moreover, the numerical information also includes a control value used for switching such as on, off, high, medium, low or the like, which is indicated by numerical information (on: 1, off: 1, high: 1, medium: 0, low: −1).

Furthermore, transmission and reception of data between the ECUs 1a, . . . , 1b, . . . , 1c, . . . , 1d, . . . , 1e, . . . , 1f, . . . , 1g, . . . , 1h, . . . and the relay devices 3a, 3b, 3c, 3d are executed by transmission and reception of a "message" in which a plurality of data are put together. When data is transmitted by the communication control section 12, each of the ECUs 1a, 1b, 1c, 1d, 1e, 1f, 1g, 1h, . . . transmits a group of data obtained by its own operation as a message.

As the communication lines (branch lines) 2c, 2d, communication lines based on the CAN protocol are used, and the communication control section 12 in each of the ECU 1c, 1c, . . . , 1d, 1d, . . . transmits and receives a message via each of the branch lines 2c and 2d based on the CAN protocol. Note that when a message is transmitted based on the CAN protocol, the message includes a message ID provided for each combination of a plurality of data, i.e. "CAN ID," and each of the ECU 1c, 1c, . . . , 1d, 1d, . . . transmits a group of attribute values at once in accordance with each combination.

The branch lines 2c and 2d are not limited thereto, and may transmit and receive a message based on a protocol such as LIN (Local Interconnect Network), FlexRay (registered trademark) or the like. The other branch lines 2a, 2b, 2e, 2f, 2g and 2h are similar to the communication lines 2c and 2d. Note that each of the branch lines 2a, 2b, 2c, 2d, 2e, 2f, 2g and 2h may also be constructed by a communication line with a different protocol in accordance with the type of data transmitted to and received from each of the ECUs 1a, . . . , 1b, . . . , 1c, . . . , 1d, . . . , 1e, . . . , 1f, . . . , 1g, . . . and 1h, . . . .

The relay device 3b includes a control section 30b (update means, judgment means) controlling the operation of components, a branch line communication section 32b (first communication means) connected to the branch lines 2c and 2d, a temporary storage area 33b using a volatile memory such as DRAM (Dynamic Random Access Memory) or SRAM (Static Random Access Memory), and a storage section 34b using a non-volatile memory such as EPROM (Erasable Programmable Read Only Memory), EEPROM (Electrically EPROM) or a flash memory. The relay device 3b further includes a first mainline communication section 35b (second communication means) connected to a main line 4a and a second mainline communication section 36b (second communication means) connected to a main line 4b. Since each of the relay devices 3a, 3e and 3d has an internal structure similar to that of the relay device 3b, detailed description will not be repeated here.

The control section 30b uses MPU (Micro Processing Unit) and is supplied with electrical power from an electrical power supply device such as an alternator or a battery of a vehicle, not illustrated, to control the operation of components.

The branch line communication section 32b implements transmission and reception of data with the ECUs 1c, 1c, . . . , 1d, 1d, . . . connected via the branch lines 2c and 2d. Transmission and reception of data between the relay device 3b and the ECUs 1c, 1c, . . . , 1d, 1d, . . . are implemented by transmission and reception of a message as described above. The branch line communication section 32b is so configured to have a plurality of ports, while messages can be transmitted to and received from the ports simultaneously. The branch line communication section 32b included in the relay device 3b in Embodiment 1 has eight ports, and is capable of simultaneous transmission and reception of messages to/from the eight ports.

The temporary storage area 33b is provided with a storage area for the database 31b in which the control section 30b stores data. The database 31b may alternatively be provided in a region in a storage device located outside the relay device 3b, and be connected to the relay device 3b to enable reading and writing. In addition to the database 31b, storage areas for the first reception buffer 37b (first buffer means) and the second reception buffer 38b (second buffer means) that temporality store the received data (message) are provided in the temporary storage area 33b.

In the storage section 34b, a correspondence table 39b which is referred to when the control section 30b communicates with another relay device through the first mainline communication section 35b is stored in advance. The correspondence table 39b will be described later in detail. The correspondence tables 39a, 39b, 39c and 39d stored in the relay devices 3a, 3b, 3c and 3d, respectively, have the same contents.

The first mainline communication section 35b implements communication with the relay device 3a connected via the main line 4a. Moreover, the second mainline communication section 36b implements communication with the relay device 3c connected via the main line 4b. The control section 30b is capable of simultaneous communication with the relay device 3a through the first mainline communication section 35b and with the relay device 3c through the second mainline communication section 36b.

The control section 30b periodically performs communication with other relay devices 3a, 3c through the first mainline communication section 35b and the second mainline communication section 36b every certain period of time, e.g. one millisecond. In the description below, such a period is referred to as a synchronizing period. In the other relay devices 3a, 3c and 3d, communication is periodically performed every certain period of time, which is accurately synchronized in time. For synchronizing the periods, either an existing or a new method may be employed. For example, the relay device 3a may have the function of receiving electric waves from a GPS (Global Positioning System) satellite to obtain time information while synchronizing a timer included in the relay device 3a with a timer included in each of the other relay devices 3b, 3c, 3d based on the obtained time information. This is because, in the vehicle-mounted communication system, it is required to reliably relay data at high speed even if there are a number of ECUs. Moreover, the same data obtained at the same time should have the same numerical information. Since faster and surely identical relaying is required, the vehicle-mounted communication system needs to perform processing at high speed and in synchronization.

The relay device 3a is also provided with the first mainline communication section 35a and the second mainline communication section 36a, and is capable of simultaneous communication. In Embodiment 1, however, the relay device 3a is connected to the relay device 3b via the main line 4a through the second mainline communication section 36a. In Embodiment 1, since the relay device 3a is not connected to any relay device other than the relay device 3b, the first mainline communication section 35a is not used. Likewise, the relay device 3d is also provided with the first mainline communication section 35d and the second mainline communication section 36d. In Embodiment 1, the relay device 3d is connected to the relay device 3c via the main line 4c through the mainline communication section 35d, not using the second mainline communication section 36d. When another relay device is further connected at a stage after the relay device 3d, the second mainline communication section 36d may be used to connect the devices in a daisy chain form, while the relay device 3d implements communication with the relay device 3c through the first mainline communication section 35d and communication with another relay device through the second mainline communication section 36d.

The communication processing between the ECUs 1a, . . . , 1b, . . . , 1c, . . . , 1d, . . . , 1e, . . . , 1f, . . . , 1g, . . . , 1h, . . . and the relay devices 3a, 3b, 3c, 3d in the vehicle-mounted communication system constructed as described above will be described.

Figure 3:
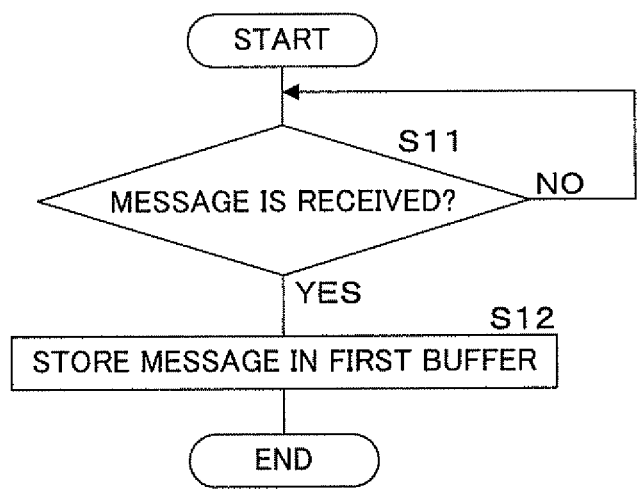
FIG. 3 is a flowchart illustrating an example of a processing procedure performed when a control section of a relay device constructing the vehicle-mounted communication system according to Embodiment 1 receives a message.

FIG. 3 is a flowchart illustrating an example of the processing procedure in the case where the control section 30a in the relay device 3a constructing the vehicle-mounted communication system in Embodiment 1 receives a message. Since the processing procedures performed by the control sections 30b, 30c and 30d in the other relay devices 3b, 3c and 3d are similar to that performed by the control section 30a in the relay device 3a, detailed description thereof will not be repeated here.

The control section 30a judges whether or not the branch line communication section 32a has received a message transmitted from the ECUs 1a, 1a, . . . , 1b, 1b, . . . connected via the branch lines 2a and 2b (step S11). When the control section 30a judges that the message has not been received (NO at step S11), the processing goes back to the step S11.

When the control section 30a judges that the message has been received (YES at step S11), it once stores the received message in the first reception buffer 37a (step S12) and terminates the processing in the case where the message has been received.

The control section 30a continues performing the processing procedure shown in the flowchart of FIG. 3. That is, each time a message is received from the ECU 1a, 1a, . . . , 1b, 1b, . . . , the control section 30a stores the message. A group of attribute values included in the message stored in the first reception buffer 37a are stored in the database 31a for each attribute value ID at a timing described later. Here, an attribute value ID and an attribute value are stored in the database 31a in the form of a pair.

The control section 30a creates a message from the attribute values of data stored in the database 31a and appropriately transmits it to the ECU 1a, 1a, . . . , 1b, 1b that require the message through the branch line communication section 32a. The timing of transmission may be, for example, scheduled for each of the ECUs 1a, 1a, . . . , 1b, 1b, . . . to which the message is transmitted. Here, the control section 30a generates and transmits a message with reference to a schedule stored in the storage section 34a. Moreover, the control section 30a may also monitor an attribute value stored in the database 31a and, when the attribute value is changed by updating the database 31a, transmit the message to ECUs 1a, 1a, . . . , 1b, 1b, . . . that require the message including the attribute value.

Subsequently, the processing performed when the relay devices 3a, 3b, 3c and 3d exchange the data stored in the respective databases 31a, 31b, 31c and 31d with one another will be described.

When the data stored in the database 31a is exchanged with the other relay devices 3b, 3c and 3d, the control section 30a basically performs the processing as described below. The control section 30a does not read out the data including a pair of an attribute value and an attribute value ID identifying the attribute value from the database 31a and transmitting the data, but performs transmission and reception using the message once stored in the first reception buffer 37b. More specifically, the control section 30a transmits a frame in which messages are put together. Such a frame will be referred to as a mainline frame in the description below. The control section 30*a* in the relay device 3*a* then receives the mainline frame transmitted from the other relay devices 3*b*, 3*c* and 3*d* through the second mainline communication section 36*a*. The control section 30*a* stores the received mainline frame in the second reception buffer 38*a*. The groups of attribute values included in messages of the mainline frame stored in the second reception buffer 38*a* are then stored in the database 31*a* at a timing described later.

Likewise, the control section 30*b* in the relay device 3*b* stores the mainline frame received through the first mainline communication section 35*b* in the second reception buffer 38*b* while transferring it through the second mainline communication section 36*b*. Note that the control section 30*b* in the relay device 3*b* can perform transmission/reception through the first mainline communication section 35*b* and transmission/reception through the second mainline communication section 36*b* at the same time. Hence, the control section 30*b* transmits the mainline frame created by the control section 30*b* to the relay device 3*c* through the second mainline communication section 36*b*, while receiving the mainline frame transmitted from the relay device 3*a* through the first mainline communication section 35*b*. The control section 30*b* gives priority to reception in the first mainline communication section 35*b* and to transmission in the second mainline communication section 36*b*. The control section 30*c* in the relay device 3*c* operates similarly to the control section 30*b* in the relay device 3*b*.

When the control section 30*d* in the relay device 3*d* receives a mainline frame from the relay device 3*c*, it stores the frame in the second reception buffer 38*d*. The control section 30*d* in the relay device 3*d* gives priority to reception over transmission in the first mainline communication section 35*d*. That is, the control section 30*d* does not transmit the mainline frame created by the control section 30*d* until the first mainline communication section 35*d* receives all of the mainline frame created and transmitted by the relay device 3*c* and the mainline frame received and transferred by the relay device 3*c*.

Transmission by each of the relay devices 3*a*, 3*b*, 3*c* and 3*d* of a mainline frame using messages as described above produces the following effects. The message transmitted and received in accordance with CAN is constructed by one or more combinations of attribute values, each combination being provided with a CAN ID. Therefore, use of a message may cut out transmission of an attribute value ID for each attribute value. In addition to the message in accordance with CAN, another structure may also be employed in that a data frame including attribute values which are more efficiently put together compared to the message transmitted from the ECUs 1*a*, 1*a*, . . . , 1*b*, 1*b*, . . . is newly defined while a data frame ID is defined in association with the number of attribute values included in the data frame and an attribute value ID corresponding to each attribute value.

FIGS. 4A and 4B are explanatory views illustrating a format example of a mainline frame transmitted by the control sections 30*a*, 30*b*, 30*c* and 30*d* of the relay devices 3*a*, 3*b*, 3*c* and 3*d* constructing the vehicle-mounted communication system according to Embodiment 1. FIG. 4A shows a format example of a mainline frame transmitted by the control sections 30*a*, 30*b*, 30*c*, 30*d* in the relay devices 3*a*, 3*b*, 3*c*, 3*d* in Embodiment 1, and FIG. 4B shows, for comparison, a format example in the case where a plurality of data including attribute value IDs and attribute values are transmitted.

As illustrated in FIG. 4A, in the format of a mainline frame, a header is attached at the beginning, while a trailer indicating termination of the mainline frame is attached at the end. Between the header and trailer of the mainline frame transmitted from the relay device 3*a*, m messages that have been received from the ECU 1*a*, 1*a*, . . . , 1*b*, 1*b*, . . . by the relay device 3*a* and stored in the first reception buffer 37*a* are included. Also included are: a message ID (CAN ID) which is pre-determined in accordance with the number of attribute values and the combination of the attribute value IDs and assigned to each message; and the total size of the immediately-following group of attribute values (information length). Here, the maximum size of the sum of the group of attribute values included in the message corresponds to 8 bytes. The field itself which indicates the size of the field of the group of attribute values (information length) in byte units corresponds to 4 bits since the maximum number is eight. Because the CAN ID is indicated by 11 bits, the size of one message corresponds to 10 bytes when it is round out in byte units.

FIG. 4B shows, for comparison with FIG. 4A, an example where a plurality of data including attribute value IDs and attribute values are transmitted. In this case also, a header is attached at the beginning while a trailer indicating termination of transmission is attached at the end. When k attribute values are included in the message received from the ECU 1*a*, 1*a*, . . . , 1*b*, 1*b*, . . . by the relay device 3*a* and stored in the first reception buffer 37*a*, k pairs of attribute value IDs and attribute values are included between the header and trailer. Here, an attribute value ID is indicated by 2 bytes.

FIG. 5 is an explanatory view illustrating an example of the contents of the correspondence table 39*a* stored in the storage section 34*a* of the relay device 3*a* constructing the vehicle-mounted communication system according to Embodiment 1. Note that n in FIG. 5 indicates an arbitrary natural number. As shown in the explanatory view of FIG. 5, the number of attribute values included is stored in association with each message ID while an attribute value ID, a position (order) in a message and an information length (in bit units) are stored for each of the included attribute values. The content example of FIG. 5 shows that the message with the message ID "1" includes "2" attribute values. It shows that the first attribute value included in the message with the message ID "1" has an attribute value ID of "1" and is included "1st" in the order with the information length of "1" bit, and that the second attribute value has an attribute value ID of "2" and is included "2nd" in the order with the information length of "1" bit.

Another example in FIG. 5 shows that the message with the message ID "2" includes "4" attribute values. It shows that the first attribute value included in the message with the message ID "2" has an attribute value ID of "20" and is included "2nd" in the order with the information length of "1" bit, and that the second attribute value has an attribute value ID of "50" and is included "4th" in the order with the information length of "8" bits. It also shows that the message with the message ID "3" includes "n" attribute values. The first attribute value included in the message with the message ID "3" has an attribute value ID of "8" and is included "4th" in the order with the information length of "3" bits. The second attribute value has an attribute value ID of "5" and is included "nth" in the order with the information length of "4" bits. It can also be seen that the message with the message ID "4" includes "64" attribute values. The first attribute value included in the message with the message ID "4" has an attribute value ID of "1" and is included "1st" in the order with the information length of "1" bit. The second attribute value has an attribute value ID of "2" and is included "2nd" in the order with the information length of "1" bit.

When the control sections 30*a*, 30*b*, 30*c* and 30*d* in the relay devices 3*a*, 3*b*, 3*c* and 3*d* receive mainline frames with the format shown in FIG. 4A, they store the received mainline frames in the second reception buffers 38a, 38b, 38c and 38d. When the relay devices 3b and 3c receive mainline frames from either one of the first mainline communication sections 35b, 35c or the second mainline communication sections 36b, 36c, they transfer the frames to the other communication sections.

For later updating the databases, the control sections 30a, 30b, 30c and 30d retrieve attribute values from mainline frames stored in the second reception buffers 38a, 38b, 38c and 38d with reference to the correspondence tables 39a, 39b, 39c and 39d, respectively, based on message IDs. By thus referring to the correspondence tables 39a, 39b, 39c and 39d, the control sections 30a, 30b, 30c and 30d in the relay devices 3a, 3b, 3c and 3d can recognize which data's attribute values are included in the messages and retrieve them even when the relay devices 3a, 3b, 3c and 3d transmit and receive data using messages including only attribute value groups but not including attribute value IDs and using mainline frames in which such messages are put together.

It is also possible for the control sections 30a, 30b, 30c and 30d to refer to the correspondence tables 39a, 39b, 39c and 39d when they receive mainline frames to retrieve attribute values in advance based on data frame IDs and store them in the second reception buffers 38a, 38b, 38c and 38d.

Accordingly, the messages received from the ECUs 1a, ..., 1b, ..., 1c, ..., 1d, ..., 1e, ..., 1f, ..., 1g, ... and 1h, ... are stored in the first reception buffers 37a, 37b, 37c and 37d. Also, mainline frames exchanged among the relay devices 3a, 3b, 3c and 3d are stored in the second reception buffers 38a, 38b, 38c and 38d.

Here, the relay device 3a located at one end (leading end) of the daisy chain form functions as a specified relay device, issuing COMMIT (notice of determination) indicating that the data to be stored in the databases 31a, 31b, 31c and 31d can be determined. The relay device 3a transmits COMMIT through the second mainline communication section 36a to the relay device 3b. The relay device 3b which received COMMIT from the relay device 3a transfers COMMIT to the neighboring relay device 3c. The relay device 3c further transfers the received COMMIT to the relay device 3d. When issuing or receiving COMMIT, the relay devices 3a, 3b, 3c and 3d reads out attribute value groups from the messages stored in the first reception buffers 37a, 37b, 37c, 37d and the second reception buffers 38a, 38b, 38c, 38d, to update the databases 31a, 31b, 31c and 31d, respectively.

Transmission and reception of mainline frames by the relay devices 3a, 3b, 3c and 3d and updating of databases 31a, 31b, 31c and 31d in Embodiment 1 are different in part for each device as described below. Each processing will be described below in detail with reference to flowcharts.

Figure 6:
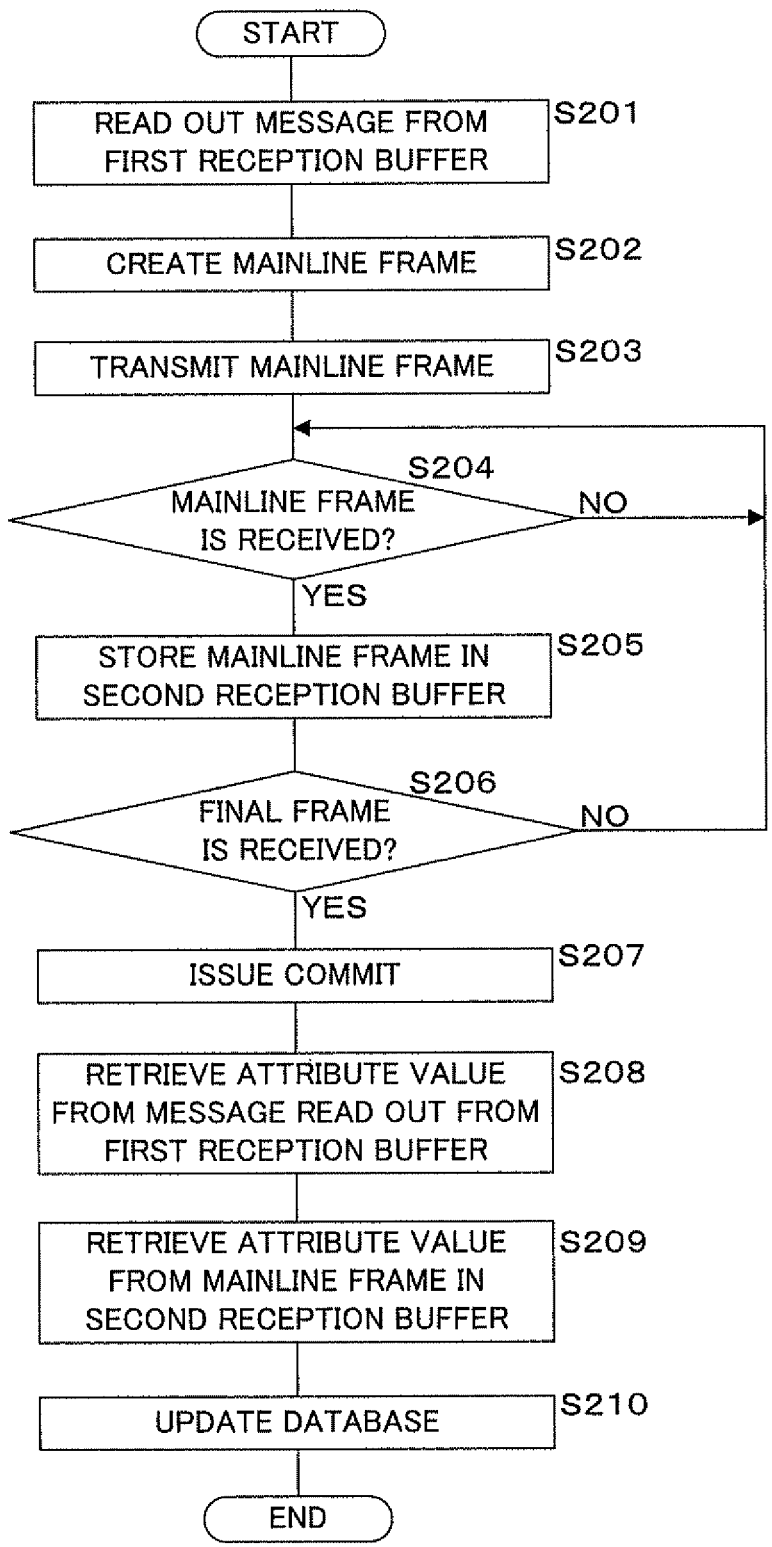
FIG. 6 is a flowchart illustrating an example of a processing procedure to be executed by a control section of a relay device serving as a specified relay device in Embodiment 1 to transmit and receive a mainline frame and update a database.

FIG. 6 is a flowchart illustrating an example of a processing procedure to be executed by the control section 30a of the relay device 3a serving as a specified relay device in Embodiment 1 to transmit and receive a mainline frame and update the database 31a.

When the synchronizing period (one millisecond for example) has arrived, the control section 30a refers to the correspondence table 39a in the storage section 34a to read out a message from the first reception buffer 37a which received the message from the ECUs 1a, 1a, ..., 1b, 1b, ... and temporarily stores it therein (step S201), create a mainline frame (step S202), and transmit the created mainline frame through the second mainline communication section 36a to the relay device 3b (step S203).

Subsequently, the control section 30a judges whether or not a mainline frame transmitted from other relay device 3b, 3c or 3d has been received by the second mainline communication section 36a (step S204). When the control section 30a judges that no main line frame has been received (NO at S204), it returns the processing back to the step S204. When the control section 30a judges that a mainline frame has been received (YES at S204), it stores the received mainline frame in the second reception buffer 38a (step S205). The control section 30a judges whether or not the final frame has been received by checking if the received mainline frame is the one transmitted from the relay device 3d (step S206). When the sender is written at the header of the mainline frame, the control section 30a can identify the sender. It can also be identified by a message ID included in the mainline frame.

The judgment process at the step S206 is performed for the reasons described below. As will be described later, the relay device 3d does not transmit the mainline frame created by the relay device 3d until it receives all of the mainline frames transmitted from the relay devices 3a, 3b and 3c. The relay device 3d transmitting the mainline frame means that all the other mainline frames including the mainline frame from the relay device 3a have reached the relay device 3d. That is, the mainline frame transmitted from the relay device 3d located the farthest from the relay device 3a which serves as a specified relay device functions as an acknowledge (ACK) for the relay device 3a. The acknowledge is then transferred from the relay device 3d and received by the relay device 3a in series, so that the relay device 3a can confirm that all mainline frames including the final frame have been received also at the relay devices 3b and 3c.

When the control section 30a judges that the received mainline frame is not the one transmitted from the relay device 3d and that the frame is not the final frame (NO at S206), it returns the processing back to the step S204. When the control section 30a judges that the received mainline frame is the one transmitted from the relay device 3d, which is the final frame (YES at S206), meaning that transmission and reception of a mainline frame are successful at all of the relay devices 3a, 3b, 3c and 3d, the control section 30a issues COMMIT so as to determine and update the data to be stored in the databases 31b, 31c, 31d at the relay devices 3b, 3c, 3d and transmits it to the relay device 3b (step S207).

The control section 30a then retrieves attribute values from the message read out from the first reception buffer 37a at the step S201 (step S208) while it also retrieves attribute values from the message included in the mainline frame stored in the second reception buffer 38a (step S209). The control section 30a stores the attribute values retrieved at the steps S208 and S209 in the database 31a to update the database 31a (step S210), and terminates the processing.

Figure 7:
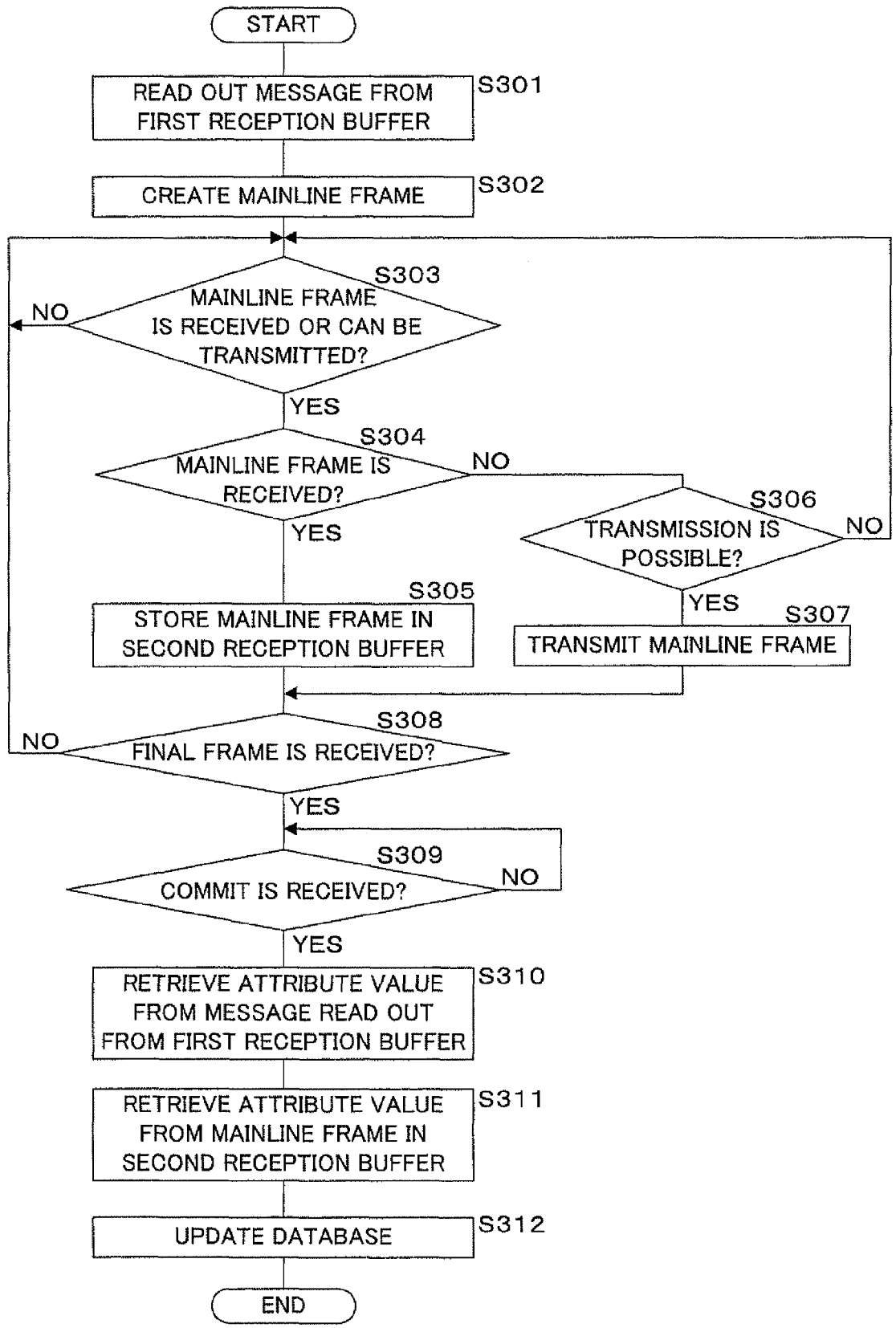
FIG. 7 is a flowchart illustrating an example of a processing procedure to be executed by a control section of a relay device in Embodiment 1 to transmit and receive a mainline frame and update a database.

FIG. 7 is a flowchart illustrating an example of a processing procedure to be executed by the control section 30b of the relay device 3b in Embodiment 1 to transmit and receive a mainline frame and update the database 31b. Since the processing procedure performed by the control section 30c in the relay device 3c is similar to the processing procedure by the control section 30b in the relay device 3b, detailed description thereof will not be repeated here.

When the synchronizing period which synchronizes in time with the relay devices 3a, 3c and 3d has arrived, the control section 30b refers to the correspondence table 39b in the storage section 34b and reads out a message from the first reception buffer 37b which has received messages from ECUs 1c, 1c, ..., 1d, 1d, ... and has temporarily stored them (step S301). The control section 30b creates a mainline frame using the read-out message (step S302).

The control section 30b judges whether or not either of the first mainline communication section 35b or the second mainline communication section 36b started receiving a mainline frame from other relay devices 3a or 3c, or whether or not either of the first mainline communication section 35b or the second mainline communication section 36b can transmit a mainline frame when there is a mainline frame to be transmitted (step S303). When neither of the first mainline communication section 35b nor the second mainline communication section 36b started receiving a mainline frame and when there is no mainline frame to be transmitted (No at S303), the control section 30b returns the processing back to the step S303.

When the control section 30b judges that either of the first mainline communication section 35b or the second mainline communication section 36b started receiving a mainline frame from the other relay devices 3a or 3c, or that either of the first mainline communication section 35b or the second mainline communication section 36b can transmit a mainline frame when there is a mainline frame to be transmitted (YES at S303), it judges whether or not the mainline frame is being received (step S304). When the control section 30b judges that the mainline frame is being received (YES at S304), it temporarily stores the received mainline frame in the second reception buffer (step S305).

When the control section 30b judges that the mainline frame is not received at the step S304 (NO at S304), it judges whether or not either of the first mainline communication section 35b or the second mainline communication section 36b can transmit the mainline frame to be transmitted (step S306). When the control section 30b judges that the transmission is impossible (NO at S306), it returns the processing back to the step S303. When it is judged that the transmission is possible (YES at S306), the control section 30b transmits the mainline frame created by the control section 30b or the mainline frame which is received from the other relay device 3a or 3c and temporarily stored to be transmitted to another device (step S307).

The processing is forwarded to the step S306 when it is judged that no mainline frame is received at the step S304. The control section 30b can, however, perform the transmission or reception by the first mainline communication section 35b and the transmission or reception by the second mainline communication section 36b at the same time. The control section 30b can receive a mainline frame by the first mainline communication section 35b while transmitting a mainline frame by the second mainline communication section 36b. Therefore, even when it is judged that either of the first mainline communication section 35b or the second mainline communication section 36b receives a mainline frame (YES at S304), the control section 30b receives and temporarily stores the mainline frame (S305) while proceeding to the step S306 and transmitting a mainline frame when either of the first mainline communication section 35b or the second mainline communication section 36b is available and when there is a mainline frame to be transmitted (S307).

Next, the control section 30b judges whether or not the mainline frame, i.e. the final frame, transmitted from the relay device 3d which received all the mainline frames as described later has been received (step S308). When it is judged that the final frame has not been received (NO at S308), the control section 30b returns the processing back to the step S303.

Reception of the final frame indicates that the control section 30b has received mainline frames from all the relay devices 3b, 3c and 3d other than itself. Thus, when the control section 30b judges that the final frame has been received (YES at S308), it judges whether or not COMMIT issued by the relay device 3a has been received (S309). When the control section 30b judges that COMMIT has not been received (NO at S309), it returns the processing back to the step S309 and waits until it judges that COMMIT is received.

When the control section 30b judges that COMMIT has been received (YES at S309), it retrieves attribute values from the message read out from the first reception buffer 37b at the step S301 (step S310). Moreover, the control section 30b retrieves attribute values from the message in the mainline frame stored in the second reception buffer 38b (step S311). The control section 30b updates the database 31b by storing the attribute values retrieved at the steps S310 and S311 in the database 31b (step S312) and terminates the processing.

Figure 8:
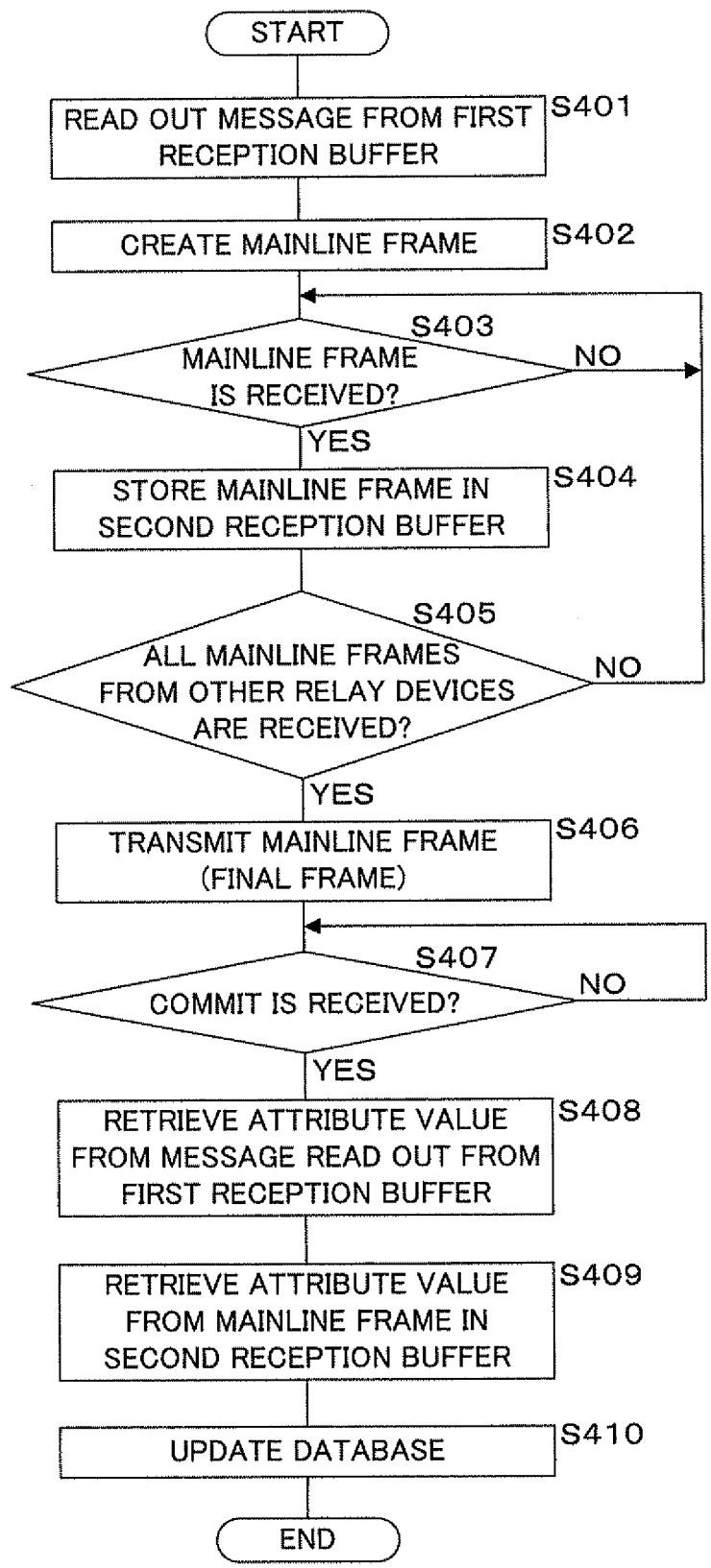
FIG. 8 is a flowchart illustrating an example of a processing procedure to be executed by a control section of a relay device in Embodiment 1 to transmit and receive a mainline frame and update a database.

FIG. 8 is a flowchart illustrating an example of a processing procedure to be executed by the control section 30d of the relay device 3d in Embodiment 1 to transmit and receive a mainline frame and update the database 31d. The relay device 3d is located at an end of the relay devices 3a, 3b, 3c and 3d connected in a daisy-chain form, opposite from the specified relay device 3a which is located at one end thereof. The relay device 3d thus performs processing partly different from those performed by the relay devices 3b and 3c that are located in between.

When the synchronizing period has arrived, which is synchronous with the relay devices 3a, 3b and 3c, the control section 30d refers to the correspondence table 39d of the storage section 34d to read out a message from the first reception buffer 37d which received the messages from the ECUs 1g, 1g, . . . , 1h, 1h, . . . and temporarily stores them (step S401). The control section 30d creates a mainline frame from the read-out message (step S402).

The control section 30d judges whether or not the first mainline communication section 35d has received a mainline frame transmitted from another relay device 3a, 3b or 3c (step S403). When the control section 30d judges that no mainline frame has been received (NO at S403), it returns the processing back to the step S403. When the control section 30d judges that a mainline frame has been received (YES at S403), it stores the received mainline frame in the second reception buffer 38d (step S404).

Next, the control section 30d judges whether or not all the mainline frames transmitted from the other relay devices 3a, 3b and 3c have been received (step S405). When it is judged that not all of them have been received (NO at S405), the control section 30d returns the processing back to the step S403. When it is judged that all of them have been received (YES at S405), the control section 30d transmits the mainline frame created by the control section 30d at the step S402 as the final frame through the first mainline communication section 35d (step S406). The final frame serves as an acknowledge for the relay device 3a as described above.

The control section 30d then judges whether or not COMMIT issued from the relay device 3a has been received (step S407). When the control section 30d judges that no COMMIT has been received (NO at S407), it returns the processing back to the step S407 and waits until it judges that COMMIT is received.

When it is judged that COMMIT has been received (YES at S407), the control section 30d retrieves attribute values from the message read out from the first reception buffer 37d at the step S401 (step S408). Moreover, the control section 30d retrieves attribute values from the message in the mainline frame stored in the second reception buffer 38d (step S409). The control section 30d updates the database 31d by storing the attribute values retrieved at the steps S408 and S409 in the database 31d (step S410) and terminates the processing.

Figure 9:
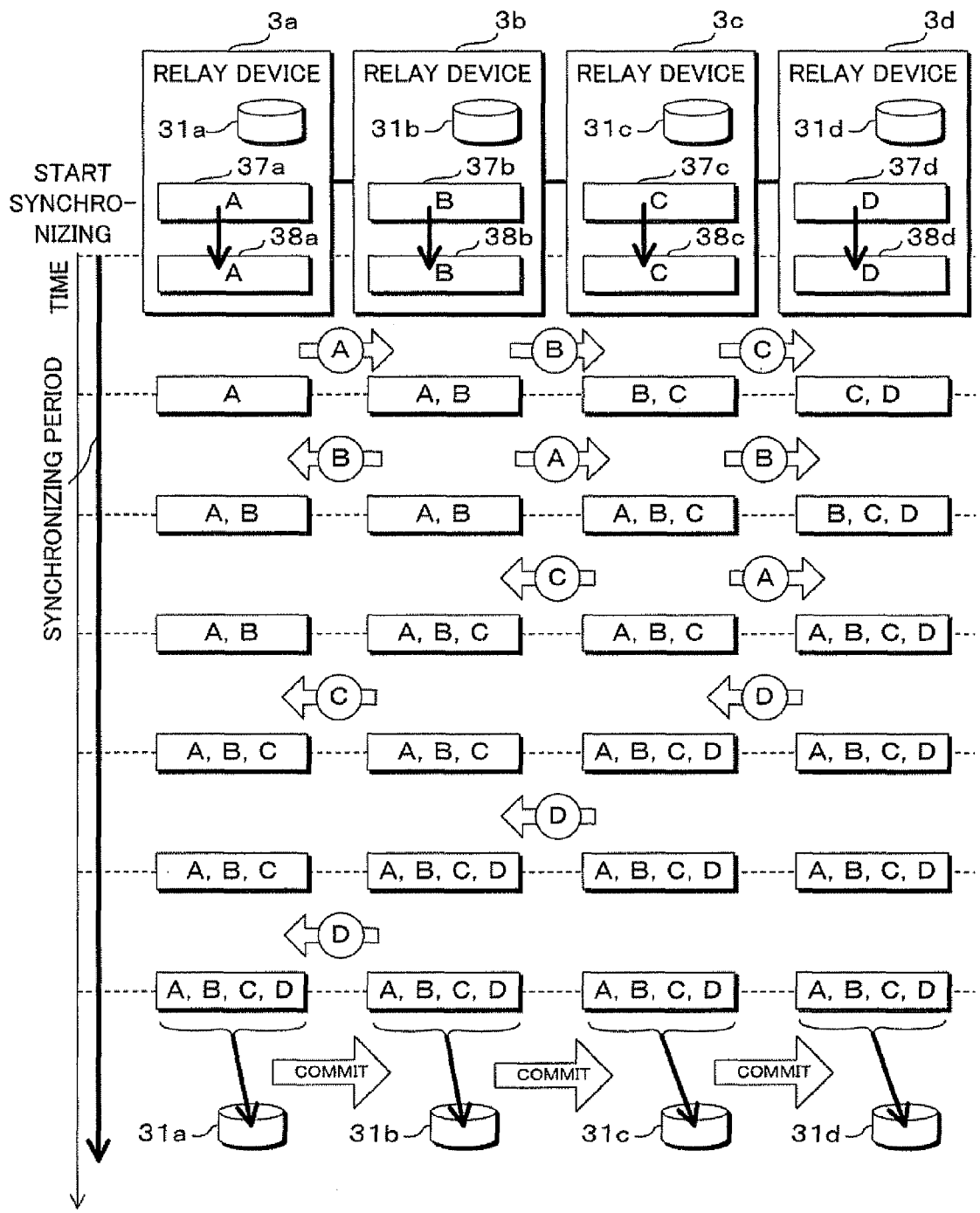
FIG. 9 is an explanatory view schematically illustrating a process of updating databases in relay devices in Embodiment 1 by transmission and reception of mainline frames.

Specific examples of the processing procedure illustrated in the flowcharts of FIGS. 6 to 8 will be described below. FIG. 9 is an explanatory view schematically illustrating a process of updating the databases 31a, 31b, 31c and 31d in the relay devices 3a, 3b, 3c and 3d in Embodiment 1 by transmission and reception of mainline frames.

The explanatory view of FIG. 9 shows the daisy-chain connection among the relay devices 3a, 3b, 3c and 3d in a block diagram. It also shows, in a block diagram, the configuration of the databases 31a, 31b, 31c and 31d, the first reception buffers 37a, 37b, 37c, 37d and the second reception buffers 38a, 38b, 38c, 38d in the relay devices 3a, 3b, 3c and 3d. Moreover, the explanatory view of FIG. 9 shows in chronological order that the control sections 30a, 30b, 30c, 30d in the relay devices 3a, 3b, 3c, 3d execute the processing procedures illustrated in the flowcharts of FIGS. 6 to 8 to transmit and receive mainline frames. The unnumbered blocks in FIG. 9 indicate the second reception buffers 38a, 38b, 38c and 38d.

As illustrated in the flowcharts of FIGS. 6 to 8, when the synchronizing period arrives, at the relay devices 3a, 3b, 3c and 3d, attribute value groups A, B, C and D to be included in the mainline frames are read out from the messages stored in the first reception buffers 37a, 37b, 37c and 37d, respectively. In the explanatory view of FIG. 9, to simplify the explanation, they are temporarily stored in the second reception buffers 38a, 38b, 38c and 38d together with the attribute value groups included in the mainline frames received from other relay devices. It is, however, not limited thereto and the read-out attribute value groups may also be stored in other storage areas in the temporary storage areas 33a, 33b, 33c and 33d.

When the synchronizing process is started, the relay device 3a transmits the mainline frame including the attribute value group A, read out from the first reception buffer 37a and created, to the relay device 3b. As described above, priority is given to reception in the first mainline communication section 35a, 35b, 35c and 35d and to transmission in the second mainline communication section 36a, 36b, 36c and 36d in each of the relay devices 3a, 3b, 3c and 3d. Hence, the relay device 3b receives the mainline frame transmitted from the relay device 3a while it transmits the mainline frame including the attribute value group B to the relay device 3c. Thus, the relay device 3b retrieves the attribute value group A from the mainline frame and stores it in the second reception buffer 38b. The relay device 3c receives the mainline frame transmitted from the relay device 3a while it transmits the mainline frame including the attribute value group C to the relay device 3d.

Subsequently, the relay device 3b transmits the mainline frame including the attribute value group A received from the relay device 3a to the relay device 3c, while it transmits the mainline frame including the attribute value group B to the relay device 3a, since the first mainline communication section 35b is available. At the same time, the relay device 3c transfers the mainline frame including the attribute value group B received from the relay device 3b to the relay device 3d, since the second mainline communication section 36c becomes available. Accordingly, the attribute value groups A, B, C are stored in the second reception buffer 38c in the relay device 3c.

At the next timing, the relay device 3c transmits the mainline frame including the attribute value group C to the relay device 3b since the first mainline communication section 35c becomes available, while it transfers the mainline frame including the attribute value group A received from the relay device 3b to the relay device 3d. Accordingly, all the attribute value groups A, B, C and D are stored in the second reception buffer 38d in the relay device 3d.

Since the relay device 3d has received all the mainline frames including the attribute value groups A, B and C, it transmits the mainline frame including the attribute value group D to the relay device 3c as the final frame. At the same time, the relay device 3b transfers the mainline frame including the attribute value group C received at a previous timing to the relay device 3a. Accordingly, all the attribute value groups A, B, C and D are stored in the second reception buffer 38c of the relay device 3c.

Unless an error occurs in transmission/reception of the final frame transmitted to the relay device 3c, the final frame is transferred from the relay device 3c to the relay device 3b, and further from the relay device 3b to the relay device 3a. Accordingly, all the attribute value groups A, B, C and D are stored also in the second reception buffers 38a and 38b of the relay devices 3a and 3b. By receiving the final frame, the relay device 3a confirms that all the relay devices 3a, 3b, 3c and 3d have received all mainline frames, and issues COMMIT.

The COMMIT issued from the relay device 3a is transmitted from the relay device 3a to the relay device 3b, from the relay device 3b to the relay device 3c, and from the relay device 3c to the relay device 3d. When COMMIT is issued or received, the relay devices 3a, 3b, 3c and 3d retrieve attribute value groups from all mainline frames that are received and stored, to renew the databases 31a, 31b, 31c and 31d, respectively.

The relay device 3a serving as a specified relay device thus issues COMMIT and transfers COMMIT in sequence among the relay devices 3b, 3c and 3d, so that the contents of the databases 31a, 31b, 31c and 31d are synchronized to have the same contents at almost the same time. They are not synchronized with each other when an error occurs in communication via the main lines 4a, 4b and 4c, i.e., when the final frame is not received at the relay device 3a serving as a specified relay device, or when COMMIT cannot be received at the relay devices 3b, 3c and 3, for example. When the databases 31a, 31b, 31c and 31d are updated in the case where any of the relay devices 3a, 3b, 3c and 3d does not receive any of the mainline data, the contents of the databases 31a, 31b, 31c and 31d will be different from each other. For example, the wheel speeds received by the ECU 1b and ECU 1c connected to the different branch lines 2b and 2c will have different concrete numerical values of 3000 (rpm) and 2500 (rpm), respectively.

In the case where a number of devices control the processing in cooperation with one another as in the vehicle-mounted communication system, data to be used needs to be identical in each of the ECUs 1a, . . . , 1b, . . . , 1c, . . . , 1d, . . . , 1e, . . . , 1f, . . . , 1g, . . . and 1h, . . . . For this end, the processing performed by the relay devices 3a, 3b, 3c and 3d in Embodiment 1 can avoid the situation where the databases 31a, 31b, 31c and 31d have different contents, ensuring the data to be identical.

Moreover, in Embodiment 1, communication among the relay devices 3a, 3b, 3c and 3d via the mainlines 4a, 4b and 4c is performed with a format of a mainline frame including a plurality of messages each having a plurality of attribute values, so that transmission and reception of an attribute value ID for each attribute value may be omitted, allowing reduction in communication amount. The effect of reduction in communication amount will be described below with concrete numerical values.

The relay devices 3a, 3b, 3c and 3d repeats the processing procedures shown in the flowchart of FIGS. 6 to 8 every one millisecond to transmit and receive mainline frames as illustrated in the explanatory view of FIG. 9. An example will be described below where eight ports of each of the branch line communication sections 32a, 32b, 32c and 32d of the relay devices 3a, 3b, 3c and 3d receive messages including 64 attribute values, each value being 1 bit, four times until the period of one millisecond arrives.

At the time point where the synchronizing period begins, 2048 attribute values, each value being 1 bit (=8 ports×4 messages (number of messages per 1 port)×64 (number of attribute values included in one message)), are stored in the first reception buffers 37a, 37b, 37c and 37d in the relay devices 3a, 3b, 3c and 3d, respectively.

The communication amount required in transmission of attribute values from the relay device 3a to the relay device 3b by means of the mainline frame as shown in FIG. 4A is calculated as represented by the formula 1 below. Here, 64 attribute values, each value being 1 bit, i.e. 8 bytes, are included in one message. Hence, one mainline frame is transmitted including 32 messages.

$$\{(ID\_L + DLC\_L + D\_L) \times m\} + H\_L + T\_L = \quad (1)$$
$$\{(11 \text{ (bits)} + 4 \text{ (bits)} + 8 \text{ (bytes)}) \times 32\} + H\_L + T\_L =$$
$$\{(10 \text{ (bytes)}) \times 32\} + H\_L + T\_L = 320 \text{ (bytes)} + H\_L + T\_L$$

wherein
ID_L: information length of message ID
DLC_L: information length of field indicating information length of attribute value group
D_L: information length of attribute value group
m: number of messages
H_L: information length of header
T_L: information length of trailer Accordingly, as illustrated in the explanatory view of FIG. 9, the communication amount among the relay devices 3a, 3b, 3c and 3d before the databases 31a, 31b, 31c and 31d synchronize with one another is calculated as represented by the formula 2 below.

$$\{1 \times 320 \text{ (bytes)} + H\_L + T\_L\} \quad (2)$$
(from the relay device 3a to the relay device 3b) +
$$\{1 \times 320 \text{ (bytes)} + H\_L + T\_L\}$$
(from the relay device 3b to the relay device 3c) +
$$\{1 \times 320 \text{ (bytes)} + H\_L + T\_L\}$$
(from the relay device 3c to the relay device 3d) +
$$\{1 \times 320 \text{ (bytes)} + H\_L + T\_L\}$$
(from the relay device 3d to the relay device 3c) +
$$\{1 \times 320 \text{ (bytes)} + H\_L + T\_L\}$$
(from the relay device 3c to the relay device 3b) +
$$\{1 \times 320 \text{ (bytes)} + H\_L + T\_L\}$$
(from the relay device 3b to the relay device 3a) =
$$1920 \text{ (bytes)} + 6 \times (H\_L + T\_L)$$

In the explanatory view of FIG. 9, mainline frames are transmitted and received twelve times among the relay devices 3a, 3b, 3c and 3d. There is, however, a case where each mainline frame is transmitted and received for each of the attribute value groups A, B, C and D, while simultaneous transmission and reception of mainline frames are performed. Hence, the time required for synchronization of the databases 31a, 31b, 31c and 31d in the period of one millisecond corresponds to the time required for transmission and reception of 1920 bytes via the main lines 4a, 4b and 4c. When the communication speed of the main lines 4a, 4b and 4c corresponds to 100 Mbps, the time required for transmission and reception of information of 1920 bytes is approximately 154 microseconds. Transmission and reception of 1920 bytes can be sufficiently performed during the period of one millisecond.

For comparison, the communication amount in the case where the relay device 3a transmits attribute values to the relay device 3b with the format in which the pairs of attribute value IDs and attribute values are included for the number of attribute values as shown in FIG. 4B will be described. The communication amount required for transmission from the relay device 3a to the relay device 3b will be calculated below as represented by the formula 3.

$$\{(\text{information length of attribute value ID} + \quad (3)$$
$$\text{information length of attribute value}) \times$$
$$\text{number of attribute values}\} + \text{information length of header} +$$
$$\text{information length of trailer} =$$
$$\{(2 \text{ (bytes)} + 1 \text{ (bit)}) \times 2048\} + h\_L + t\_L = 4352 \text{ (bytes)} + h\_L + t\_L$$

wherein
h_L: information length of header
t_L: information length of trailer

Accordingly, the communication amount among the relay devices 3a, 3b, 3c and 3d will be calculated as represented by the formula 4 below. Here, the relay devices 3b, 3c and 3d adds the attribute value groups stored in their reception buffers 37b, 37c and 37d to the received mainline frames and transfer them. Then, the relay device 3d that receives mainline frames including attribute value groups A, B and C transmits mainline frames including all the attribute value groups A, B, C and D to the relay device 3c. The mainline frame including all the attribute value groups A, B, C and D is thus transferred sequentially from the relay device 3c to the relay device 3b, and from the relay device 3b to the relay device 3a.

$$\{1 \times 4352 \text{ (bytes)} + h\_L + t\_L\} \quad (4)$$
(from the relay device 3a to the relay device 3b) +
$$\{2 \times 4352 \text{ (bytes)}\}$$
(from the relay device 3b to the relay device 3c) +
$$\{3 \times 4352 \text{ (bytes)}\} \text{ (from the relay device 3c to}$$
$$\text{the relay device 3d)} + \{4 \times 4352 \text{ (bytes)}\}$$
(from the relay device 3d to the relay device 3c) +
$$\{4 \times 4352 \text{ (bytes)}\} \text{ (from the relay device 3c to}$$
$$\text{the relay device 3b)} + \{4 \times 4352 \text{ (bytes)}\}$$
(from the relay device 3b to the relay device 3a) =
$$78336 \text{ (bytes)} + (h\_L + t\_L)$$

According to the formula 4, information amount of 78336 bytes needs to be transmitted and received among the main lines 4a, 4b and 4c during the period of every one millisecond. When, however, the communication speed for the main lines 4a, 4b and 4c is 100 Mbps, the time required for transmission/reception of the information amount of 78336 bytes is 6 milliseconds. The period of one millisecond for transmission and reception is not sufficient.

As described above, when data is transmitted and received among the relay devices 3a, 3b, 3c and 3d in order to synchronize the contents of the databases 31a, 31b, 31c and 31d, a mainline frame with the format as shown in FIG. 4A is created for transmission and reception. This can reduce the communication amount among the relay devices 3a, 3b, 3c and 3d to as small as approximately one fortieth. Hence, the time required for synchronization of the databases 31a, 31b, 31c and 31b among the relay devices 3a, 3b, 3c and 3d can be shortened, enabling the synchronization to be completed at high speed. Therefore, identity of data and immediacy of relay among the ECUs 1a, . . . , 1b, . . . , 1c, . . . , 1d, . . . , 1e, . . . , 1f, . . . , 1g, . . . and 1h, . . . connected to different branch lines 2a, 2b, 2c, 2d, 2e, 2f, 2g and 2h can be secured.

Embodiment 2

In Embodiment 1, an example was described where transmission and reception of both mainline frames and COMMIT among the relay devices 3a, 3b, 3c and 3d were successfully performed as shown in the flowcharts of FIGS. 6 to 8 and the explanatory view of FIG. 9. In the configuration described in Embodiment 2, even if the transmission and reception of any one of the above fail, the process of recovering as soon as possible and maintaining databases to be identical is additionally performed.

The configuration of a vehicle-mounted communication system in Embodiment 2 is similar to that in Embodiment 1, except for the details of the processing performed by the relay devices 3a, 3b, 3c and 3d. Therefore, the components are denoted by the same reference codes as those in Embodiment 1 and detailed description thereof will not be repeated here. Different parts of the processing will be described below in detail.

The relay devices 3a, 3b, 3c and 3d in Embodiment 2 store age information, indicating the length of time passed from storage or reception, in addition to the data stored in the databases 31a, 31b, 31c and 31d, respectively. More specifically, each time a synchronizing period passes, the control section 30a, 30b, 30c and 30d of the relay devices 3a, 3b, 3c and 3d adds, one by one, an age consisting of a natural number attached to an attribute value, when the attribute value is not updated.

Moreover, the relay device 3a in Embodiment 2 stores, in the temporary storage area 33a, the information on whether or not it has issued COMMIT during the synchronizing period. Each of the relay devices 3b and 3c also stores, in each of the temporary storage areas 33b and 33c, the information on whether or not the final frame has been received and whether or not COMMIT has been received during the synchronizing period. The relay device 3d also stores information on whether or not COMMIT has been received during the synchronizing period.

The relay device 3a then transmits, together with the mainline frame created when the synchronizing period is started, COMMIT presence/absence information (notification information) indicating whether or not COMMIT was issued the previous time. When the COMMIT presence/absence information is received, each of the relay devices 3b, 3c and 3d performs a recovering process when needed depending on the contents of the received information.

Details of the processing performed by each of the relay devices 3a, 3b, 3c and 3d will be described below with reference to flowcharts.

Figure 10:
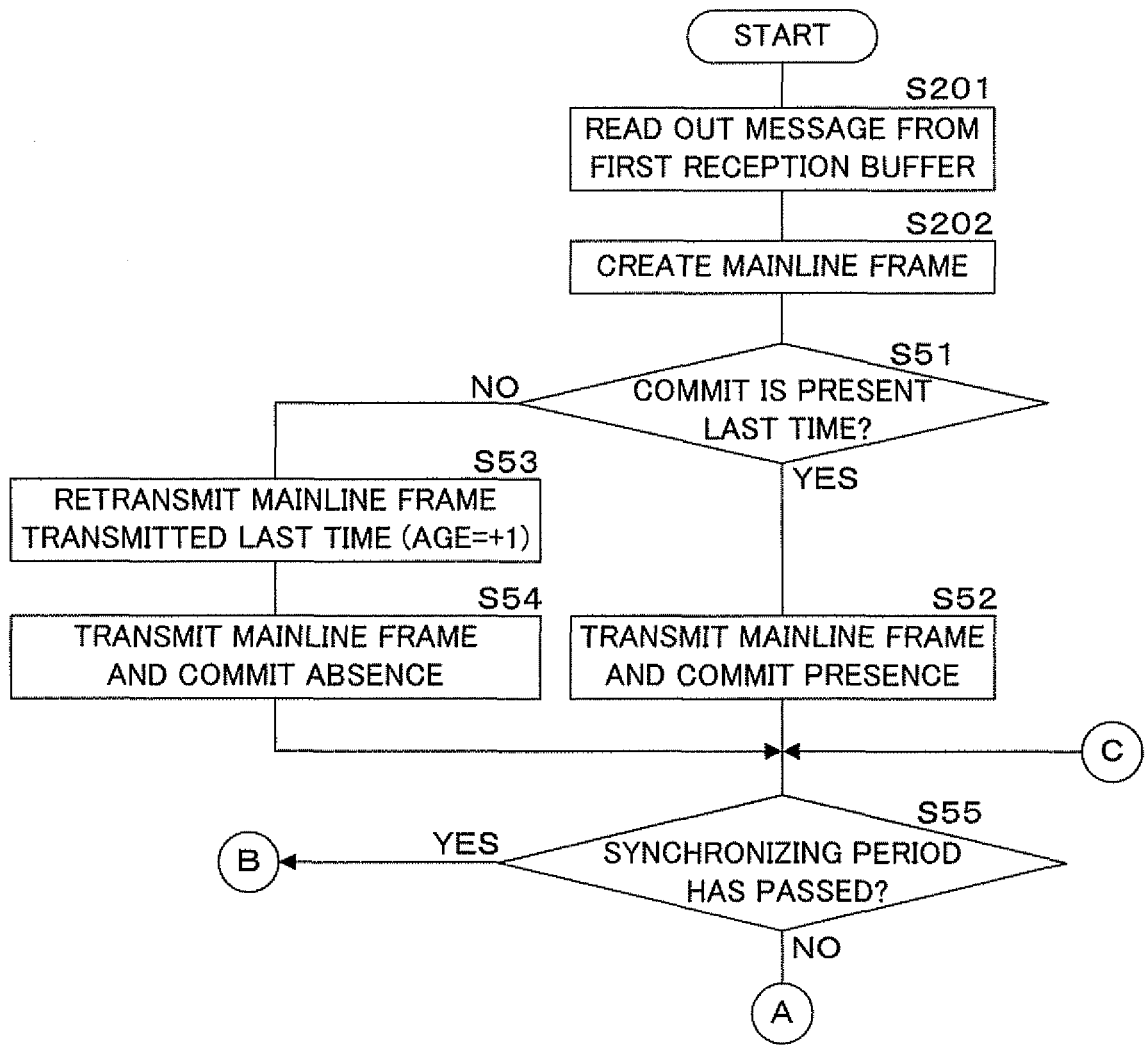
FIG. 10 is a flowchart illustrating an example of a processing procedure to be executed by a control section of a relay device in Embodiment 2 to transmit and receive a mainline frame and update a database.
Figure 11:
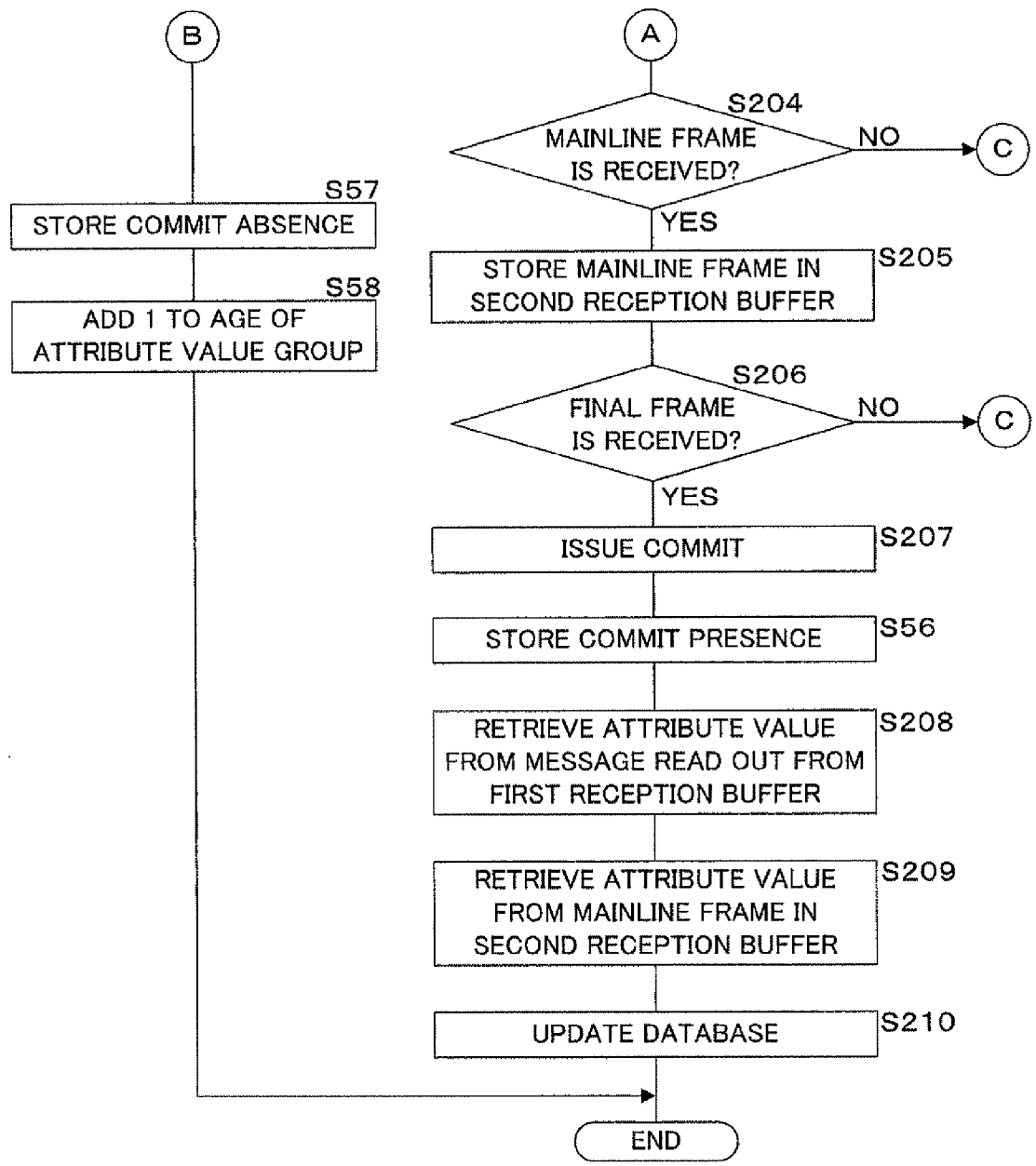
FIG. 11 is a flowchart illustrating an example of a processing procedure to be executed by a control section of a relay device in Embodiment 2 to transmit and receive a mainline frame and update a database.

FIGS. 10 and 11 are flowcharts illustrating examples of the processing procedure to be executed by the control section 30a of the relay device 3a in Embodiment 2 to transmit and receive a mainline frame and update the database 31a. Note that the processing in common with the processing procedure shown in the flowchart of FIG. 6 in Embodiment 1 will be denoted by the same step numbers and will not be described here in detail.

The control section 30a creates a mainline frame (S202), and then judges whether or not COMMIT was issued (COMMIT presence/absence) during the preceding synchronizing period with reference to the information stored in the temporary storage area 33a (step S51). When the control section 30a judges that the COMMIT was issued the previous time (YES at S51), meaning that the databases 31b, 31c and 31d are also supposed to be updated in the relay devices 3b, 3c and 3d, it transmits the mainline frame created at the step S202 and information of COMMIT presence indicating that COMMIT have been issued (step S52).

When the control section 30a judges that no COMMIT was issued because the final frame was not received the previous time (NO at S51), it retransmits the mainline frame that was transmitted the previous time (step S53). To the attribute value group included in the retransmitted mainline frame, an age added by one is attached as will be described later. The control section 30a then transmits the mainline frame created at the step S202 and information of COMMIT absence indicating that COMMIT has not been issued (step S54).

The control section 30a judges whether or not the synchronizing period of one millisecond has passed since the start of the processing (step S55). When the control section 30a judges that the synchronizing period has not passed yet (NO at S55), it judges whether or not a mainline frame transmitted from the other relay devices 3b, 3c and 3d has been received (S204). When it is judged that no mainline frames have been received (NO at S204), the processing is returned to the step S55.

When the control section 30a judges that a mainline frame has been received from any one of the other relay devices 3b, 3c and 3d (YES at S204), it stores the mainline frame (S205) and judges whether or not the received mainline frame is the final frame (S206). When the control section 30a judges that the frame is not the final frame (NO at S206), it returns the processing back to the step S55.

When the control section 30a receives the final frame (YES at S206) and issues COMMIT (S207), it stores that COMMIT has been issued (COMMIT presence) (step S56), retrieves attribute values from the first reception buffer 37a and the second reception buffer 38a (S208, S209), updates the database 31a (S210) and terminates the processing in the synchronizing period.

When the control section 30a judges that the synchronizing period has passed without the final frame being received (YES at S55), it stores that COMMIT has not been issued (COMMIT absence) (step S57), adds one to the age attached to the attribute value group included in the message read from the first reception buffer 37a and the attribute value group included in the message in the mainline frame of the second reception buffer (step S58), and terminates the process in the synchronizing period without updating the database 31a.

Figure 12:
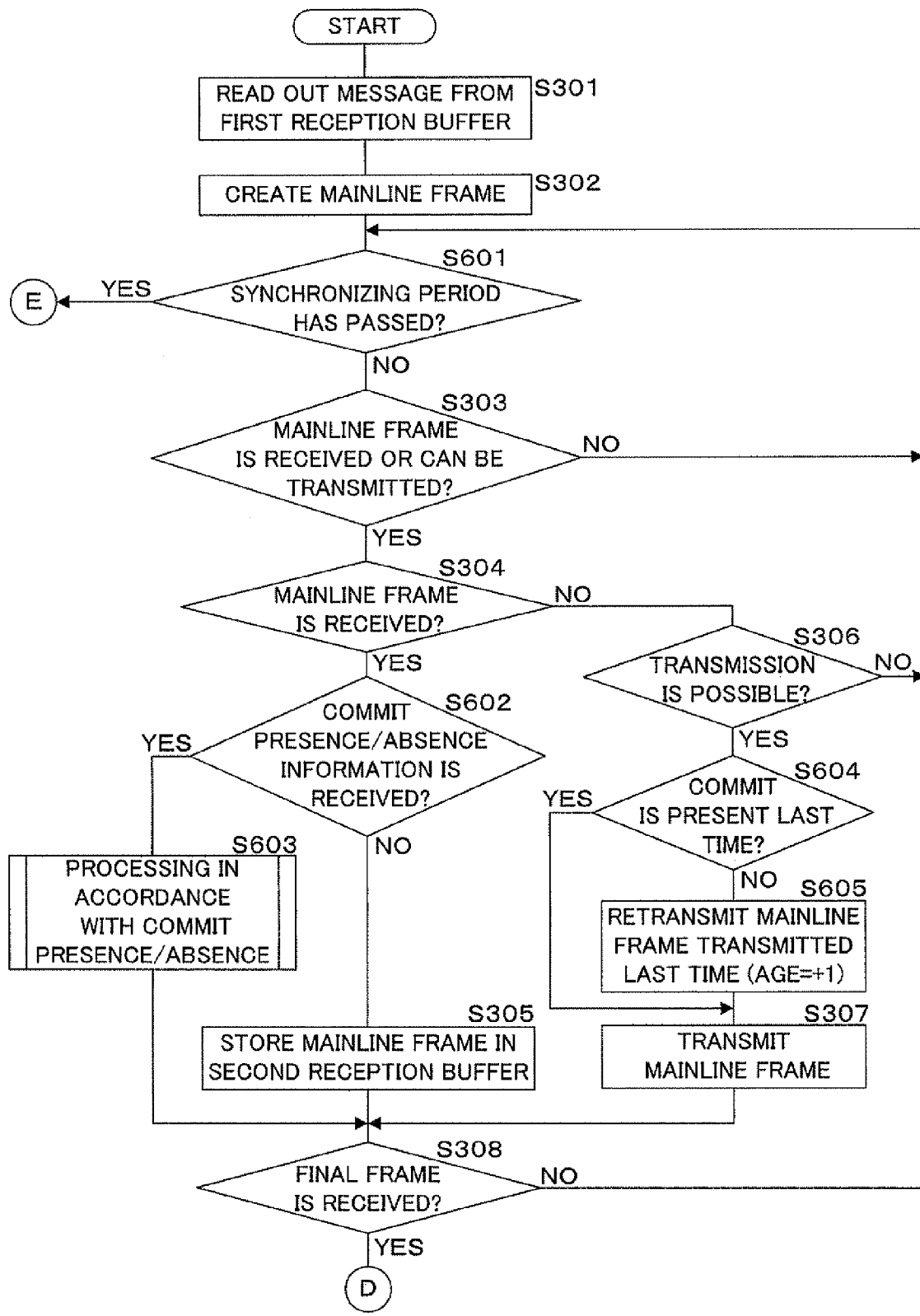
FIG. 12 is a flowchart illustrating an example of a processing procedure to be executed by a control section of a relay device in Embodiment 2 to transmit and receive a mainline frame and update a database.
Figure 13:
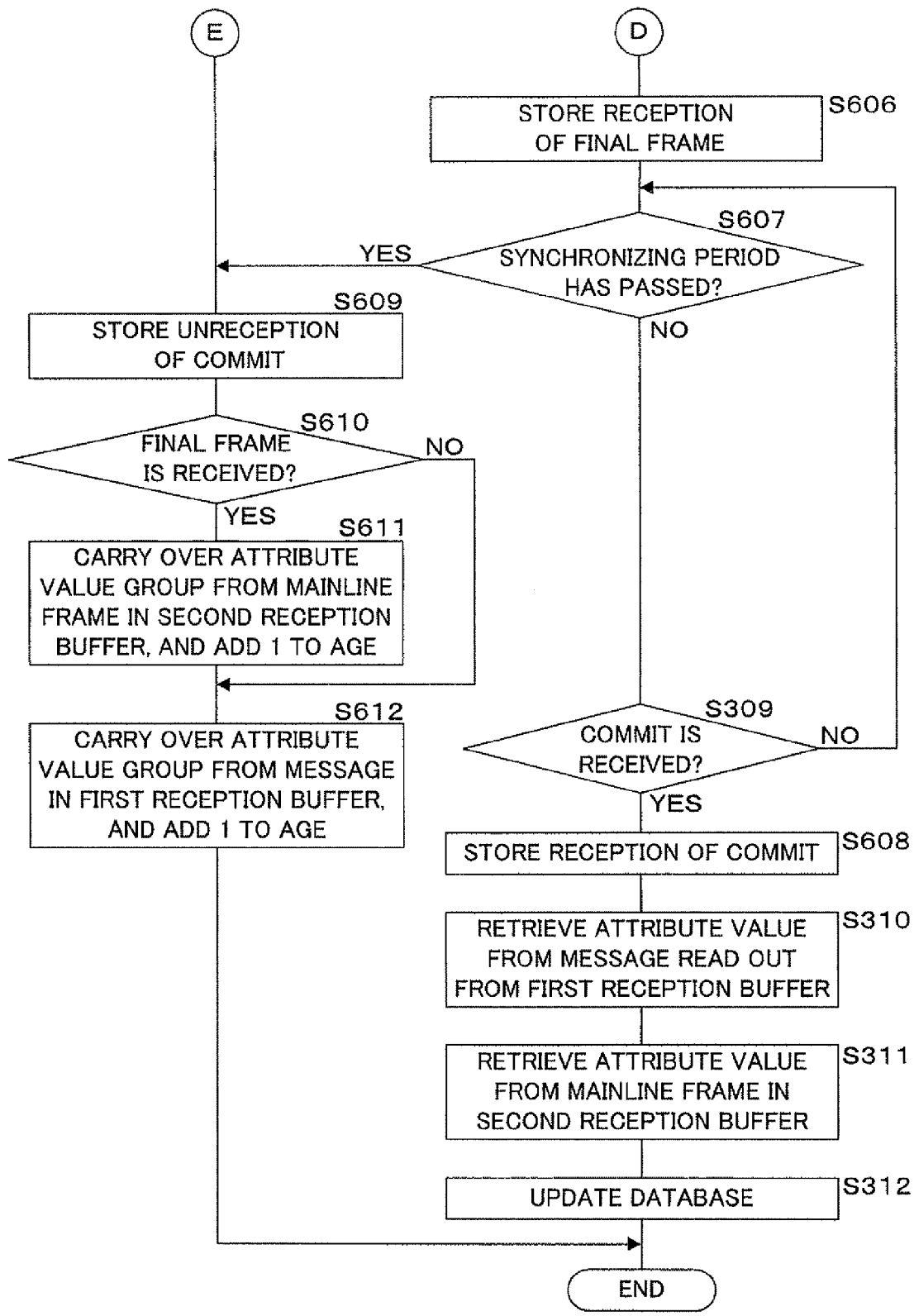
FIG. 13 is a flowchart illustrating an example of a processing procedure to be executed by a control section of a relay device in Embodiment 2 to transmit and receive a mainline frame and update a database.

FIGS. 12 and 13 are flowcharts illustrating examples of the processing procedure to be executed by the control section 30b of the relay device 3b in Embodiment 2 to transmit and receive a mainline frame and update the database 31b. Since the processing procedure performed by the control section 30c of the relay device 3c is similar to that performed by the control section 30b of the relay device 3b, detailed description thereof will not be repeated here. Moreover, the processing in common with the processing procedure shown in the flowchart of FIG. 7 in Embodiment 1 will be denoted by the same step numbers and will not be described here in detail.

The control section 30b creates a mainline frame (S302) and then judges whether or not the synchronizing period of one millisecond has passed since the start of the processing (step S601). When the control section 30b judges that the synchronizing period has not passed (NO at S601), it judges whether or not reception of mainline frames from other relay devices 3a or 3d has started, or whether or not transmission of the mainline frame to be transmitted is possible (S303).

When the control section 30b judges that the mainline frame has been received (YES at S304), it judges whether or not the received mainline frame is the one transmitted from the relay device 3a and COMMIT presence/absence information has also been received together therewith (step S602). When the control section 30b judges that the COMMIT present/absence information has not been received (NO at S602), meaning that the received mainline frame is the one transmitted from the relay device 3c, it stores the mainline frame in the second reception buffer 38b (S305) and proceeds to the step S308.

When the control section 30b judges that the COMMIT presence/absence information has been received together (YES at S602), it performs the processing in accordance with the received COMMIT presence/absence information (step S603) and proceeds to the step S308. The processing in accordance with the COMMIT presence/absence information performed at the step S603 will be described later in detail (see FIG. 14).

When the control section 30b judges that no mainline frame has been received at the processing performed from the steps S303 to S307 and that transmission thereof is not possible (NO at S303, NO at S306), it returns the processing back to the step S601.

When the control section 30b judges that the transmission is possible (YES at S306), it judges whether or not COMMIT has been received (COMMIT presence) in the preceding synchronizing period according to the stored information of its own (step S604). When the control section 30b stores the information indicating that COMMIT has been received (YES at S604), it transmits the mainline frame which is temporarily stored to be transmitted (S307). When the control section 30b does not store the information indicating that COMMIT has been received at the step S604 (NO at S604), it retransmits the mainline frame created by control section 30b and transmitted the previous time (step S605). Note that an age added by one is attached to the attribute value groups included in the retransmitted mainline frame, as will be described later.

The control section 30b judges whether or not the final frame has been received at step S308 (S308). When the control section 30b judges that the final frame has not been received (NO at S308), it returns the processing back to the step S601. When the control section 30b judges that the final frame has been received (YES at S308), it stores the information indicating that the final frame has been received (step S606).

After receiving and storing the final frame, the control section 30b judges whether or not the synchronizing period has passed by the time COMMIT is received (step S607). When the control section 30b judges that the synchronizing period has not passed (NO at step S607), it judges whether or not COMMIT has been received (S309). When the control section 30b judges that COMMIT has not been received (NO at S309), it returns the processing back to the step S607. When the control section 30b judges that COMMIT has been received before the synchronizing period passes (YES at S309), it stores the information indicating that COMMIT has been received (step S608), retrieves the attribute values from the first reception buffer 37b and the second reception buffer 38b (S310, S311), updates the database 31b (S312) and terminates the processing in the synchronizing period.

When the control section 30b judges that the synchronizing period has passed without reception of the final frame at the step S601 (YES at S601), and when it judges that the synchronizing period has passed without reception of COMMIT at the step S607 (YES at S607), the control section 30b stores the information indicating that COMMIT has not been received (unreceived) (step S609). The control section 30b judges whether or not the final frame has been received (step S610). When it judges that the final frame has been received (YES at S610), the control section 30b carries over the attribute value groups included in the messages in all of the received mainline frames stored in the second reception buffer 38b, and adds one to the attached age (step S611). Furthermore, the control section 30b carries over the attribute value group included in the message read out from the first reception buffer 37b, adds one to the attached age (step S612) and terminates the processing in the synchronizing period.

When the control section 30b judges that no final frame has been received at the step S610 (NO at S610), it carries over the attribute value group included in the message read out from the first reception buffer 37b, adds one to the attached age (S612) and terminates the processing in the synchronizing period.

Figure 14:
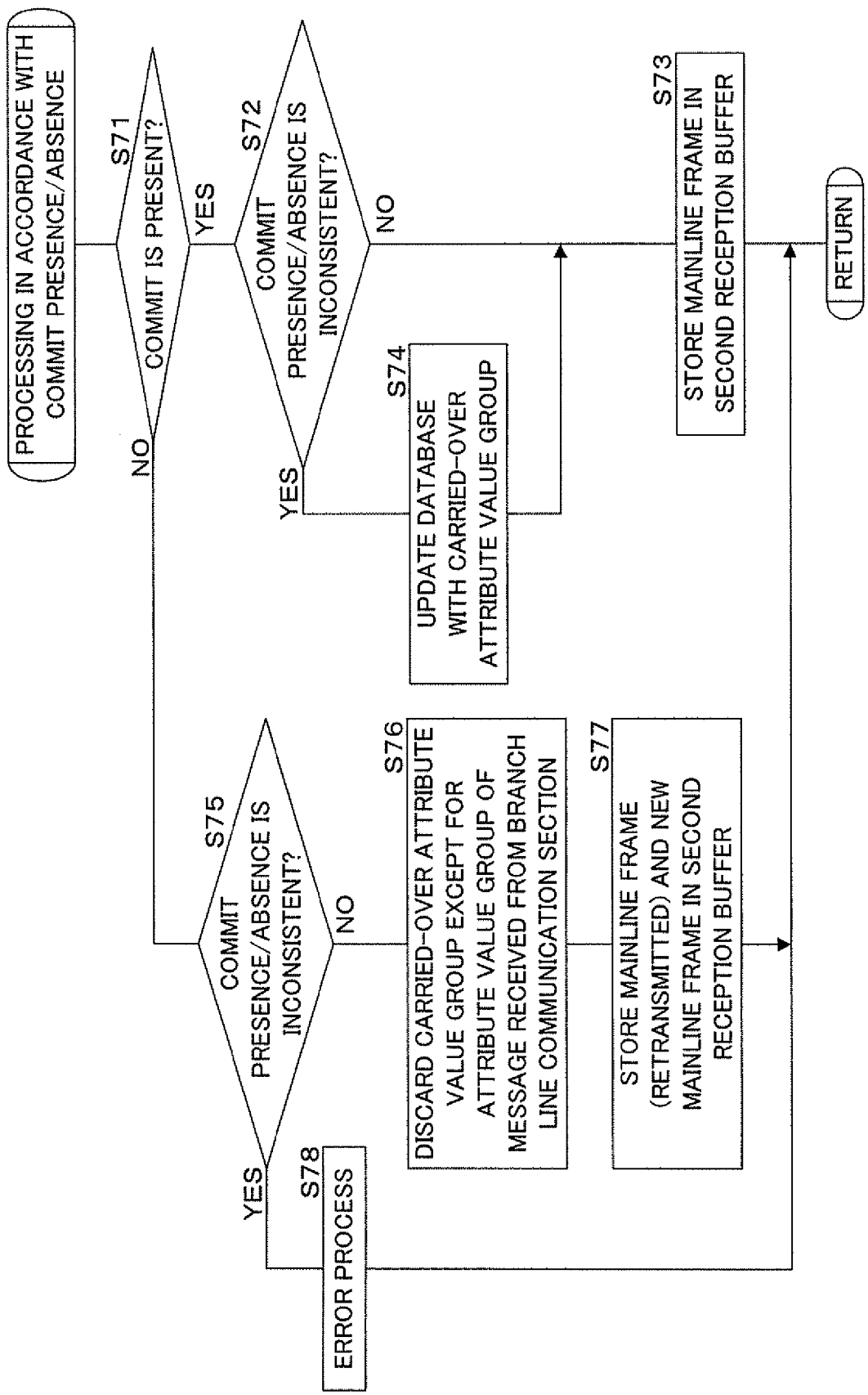
FIG. 14 is a flowchart illustrating details of processing in response to COMMIT presence/absence information executed by a control section of a relay device in Embodiment 2.

FIG. 14 is a flowchart illustrating details of processing in response to COMMIT presence/absence information executed by the control section 30b of the relay device 3b in Embodiment 2. The control section 30c in the relay device 3c performs similar processing.

When the control section 30b receives COMMIT presence/absence information from the relay device 3a together with the mainline frame (FIG. 12, YES at step S602), it judges whether or not the received COMMIT presence/absence information indicates COMMIT presence, i.e. that COMMIT was issued the previous time (COMMIT presence) (step S71). When the control section 30b judges that the COMMIT presence/absence information indicates COMMIT presence (YES at S71), it judges whether or not the information is inconsistent with its own information indicating whether or not the COMMIT has been received (step S72). When the control section 30b judges that the COMMIT has also been received in the preceding synchronizing period according to the stored information of its own, meaning that the information is consistent (NO at S72), it stores the new mainline frame received from the relay device 3a directly in the second reception buffer 38b since the database 31b is synchronized in the preceding synchronizing period (step S73), and returns the processing back to the step S308 in the flowcharts of FIGS. 12 and 13.

When the control section 30b judges that COMMIT has not been received in the preceding synchronizing period according to its stored information, meaning that there is inconsistence (YES at S72), it updates the database 31b by the attribute value group carried over in the preceding synchronizing period, since the relay device 3a has issued COMMIT and already updated the database 31a (step S74). Here, since the relay devices 3a, 3b, 3c and 3d are connected in a daisy-chain form, when the relay device 3a has issued COMMIT, the relay device 3b is supposed to have transferred the final frame. Thus, the carried-over data correspond to all attribute value groups, the same as the contents of the database 31a.

That is, even if reception of COMMIT failed at the preceding synchronizing period, synchronization with the contents of the database 31a in the relay device 3a can be recovered at this point. The control section 30b then stores the received mainline frame in the second reception buffer 38b (S73) and returns the processing back to the step S308 in the flowcharts of FIGS. 12 and 13.

When the control section 30b judges that the COMMIT presence/absence information indicates COMMIT absence at the step S71 (NO at S71), it judges whether or not the information is inconsistent with its own information indicating whether or not the COMMIT has been received (step S75). When the control section 30b judges that COMMIT has not been received in the preceding synchronizing period also in its own stored information, meaning the information is consistent (NO at S75), it discards the attribute value group carried over in the preceding synchronizing period, except for the attribute value group retrieved from the message received by the branch line communication section 32b (step S76). Here, since the previously-transmitted mainline frame is retransmitted from the relay device 3a, the control section 30b stores the retransmitted mainline frame and the newly-created and transmitted mainline frame in the second reception buffer 38b (step S77), and returns the processing back to the step S308 in the flowcharts of FIGS. 12 and 13.

When the control section 30b judges that COMMIT has been received in the preceding synchronizing period according to the stored information of its own at the step S75, meaning that there is inconsistence (YES at S75), it performs an error process because such a situation is unexpected (step S78) and returns the processing back to the step S308 in the flowcharts of FIGS. 12 and 13.

Figure 15:
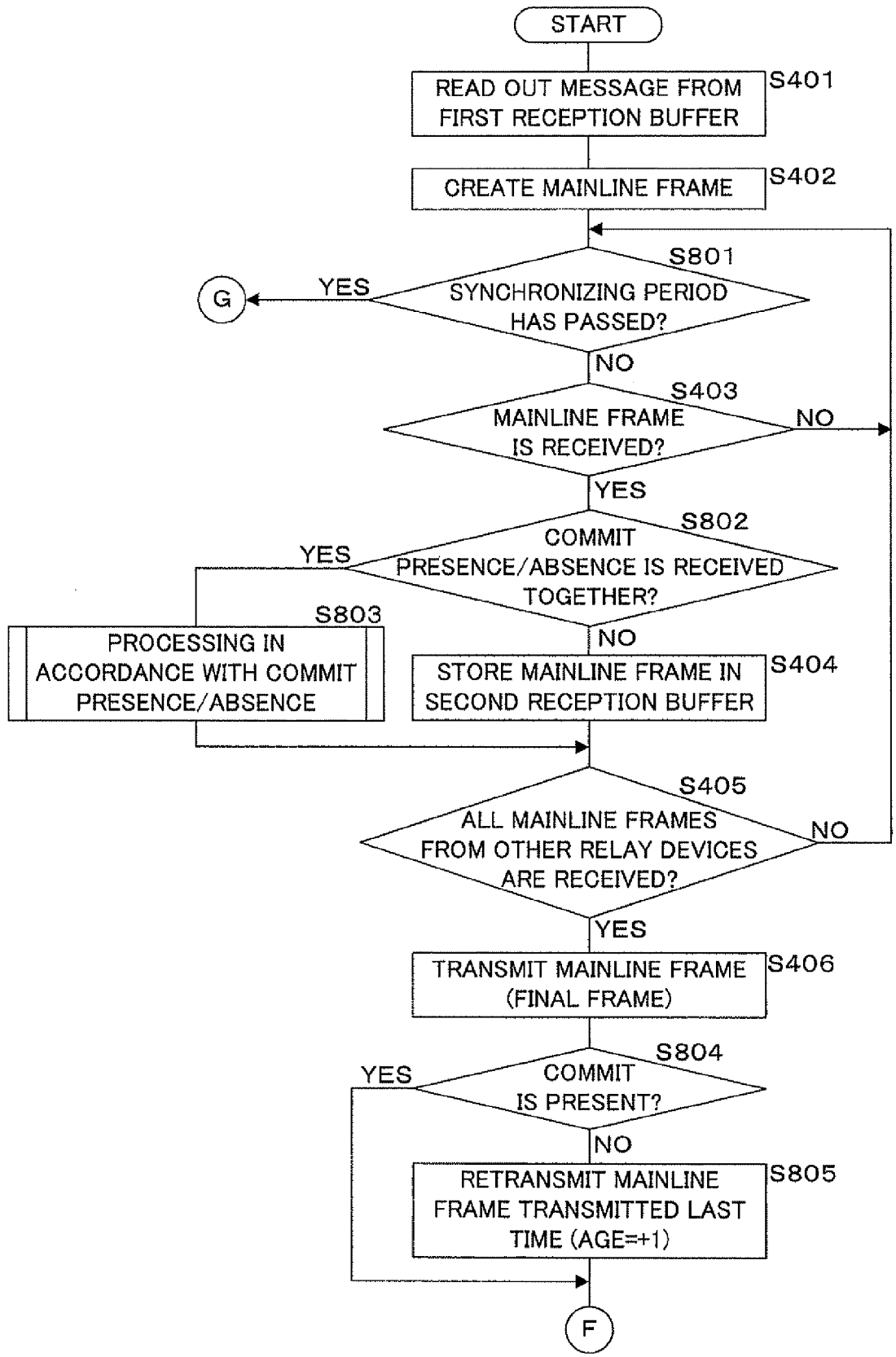
FIG. 15 a flowchart illustrating an example of a processing procedure to be executed by a control section of a relay device in Embodiment 2 to transmit and receive a mainline frame and update a database.
Figure 16:
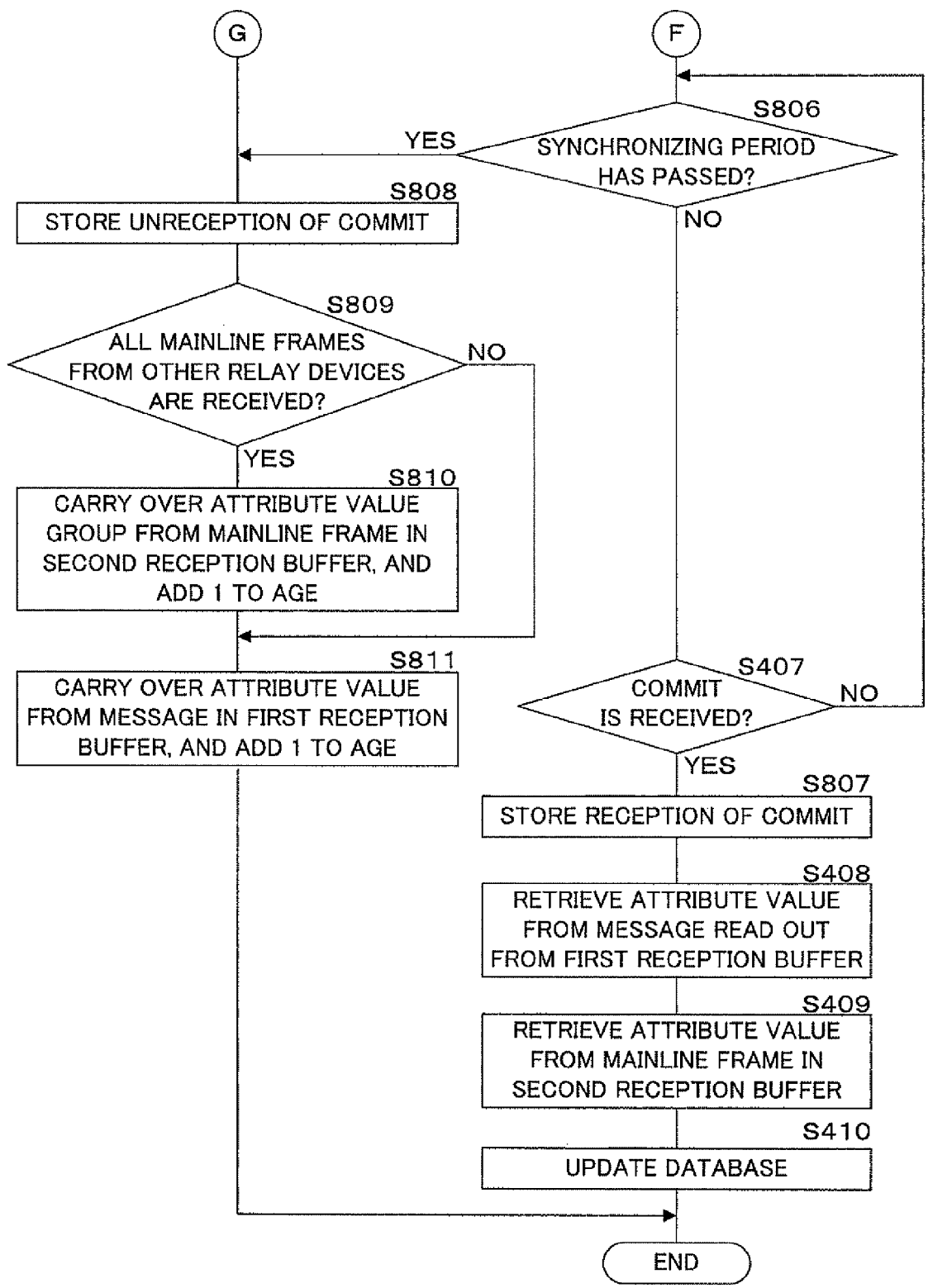
FIG. 16 a flowchart illustrating an example of a processing procedure to be executed by a control section of a relay device in Embodiment 2 to transmit and receive a mainline frame and update a database.

FIGS. 15 and 16 are flowcharts illustrating examples of the processing procedure to be executed by the control section 30d of the relay device 3d in Embodiment 2 to transmit and receive a mainline frame and update the database 31d. The processing procedures in common with those shown in the flowchart of FIG. 8 in Embodiment 1 will be denoted by the same step numbers and will not be described here in detail.

After creating the mainline frame (S402), the control section 30d judges whether or not the synchronizing period of one millisecond has passed since the start of the processing (step S801). When the control section 30d judges that the synchronizing period has not passed (NO at S801), it judges whether or not a mainline frame transmitted from the relay device 3a, 3b or 3c has been received (S403). When the control section 30d judges that no mainline frame has been received (NO at S403), it returns the processing back to step S801.

When the control section 30d judges that a mainline frame has been received (YES at S403), it judges whether or not the received mainline frame is the one transmitted from the relay device 3a and whether or not COMMIT presence/absence information has also been received together therewith (step S802). When the control section 30d judges that COMMIT presence/absence information has not been received (NO at S802), meaning that the mainline frame is the one transmitted from the relay device 3b or 3c, it stores the mainline frame in the second reception buffer 38d (S404) and proceeds to the step S405.

When the control section 30d judges that COMMIT presence/absence information has been received (YES at S802), it performs the processing in accordance with the received COMMIT presence/absence information (step S803) and proceeds to the step S405. Since the processing in accordance with COMMIT presence/absence information at the step S803 is the same as the processing described for the relay device 3b (FIG. 12, step S603), detailed description thereof will not be repeated here (see FIG. 14).

When the control section 30d judges that not all of the mainline frames from the other relay devices 3a, 3b and 3c have been received at the step S405 (NO at S405), it returns the processing back to the step S801. When the control section 30d judges that all the mainline frames have been received (YES at S405), it transmits the final frame created by the control section 30d (S406).

Here, the control section 30d judges whether or not the received COMMIT presence/absence information indicates COMMIT presence (step S804). When COMMIT presence/absence information indicates COMMIT absence (NO at S804), the control section 30d retransmits the mainline frame (final frame) created and transmitted by the control section 30d in the preceding synchronizing period (step S805). This is because the final frame transmitted in the preceding synchronizing period has not reached at least the relay device 3a. To the attribute value groups included in the retransmitted mainline frame, an age added by one is attached as will be described later. When COMMIT presence is indicated (YES at S804), the control section 30d proceeds to the next step S806. Here, there is no need to retransmit the mainline frame because the database 31d has been updated by the normal processing in the previous time or, even if it was carried over the previous time, it was updated in the processing at the step S803.

The control section 30d then judges whether or not the synchronizing period has passed by the time COMMIT issued by the relay device 3a is received (step S806). When the control section 30d judges that the synchronizing period has not passed (NO at S806), it judges whether or not COMMIT has been received (S407). When it judges that COMMIT has not been received (No at S407), the control section 30d returns the processing back to the step S806. When the control section 30b judges that COMMIT has been received before the synchronizing period passes (YES at S407), it stores the information indicating that COMMIT has been received (step S807), retrieves attribute values from the first reception buffer 37d and the second reception buffer 38d (S408, S409), updates the database 31d (S410), and terminates the processing in the synchronizing period.

When the control section 30d judges that the synchronizing period has passed without reception of all the mainline frames from the relay devices 3a, 3b and 3c at the step S801 (YES at S801), and that the synchronizing period has passed without reception of COMMIT at the step S806 (YES at S806), it stores the information indicating that COMMIT has not been received (unreceived) (step S808). The control section 30d judges whether or not all the mainline frames from the relay devices 3a, 3b and 3c have been received (step S809). When the control section 30d judges that all the mainline frames have been received (YES at S809), it carries over the attribute value groups included in the messages in the received mainline frame stored in the second reception buffer 38d and adds one to the attached age (step S810). Furthermore, the control section 30d carries over the attribute value group included in the message read out from the first reception buffer 37d, adds one to the attached age (step S811), and terminates the processing in the synchronizing period.

When the control section 30d judges that not all of the mainline frames are received at the step S809 (NO at S809), it carries over the attribute value group included in the message read out from the first reception buffer 37d, adds one to the attached age (S811) and terminates the processing in the synchronizing period.

Figure 17:
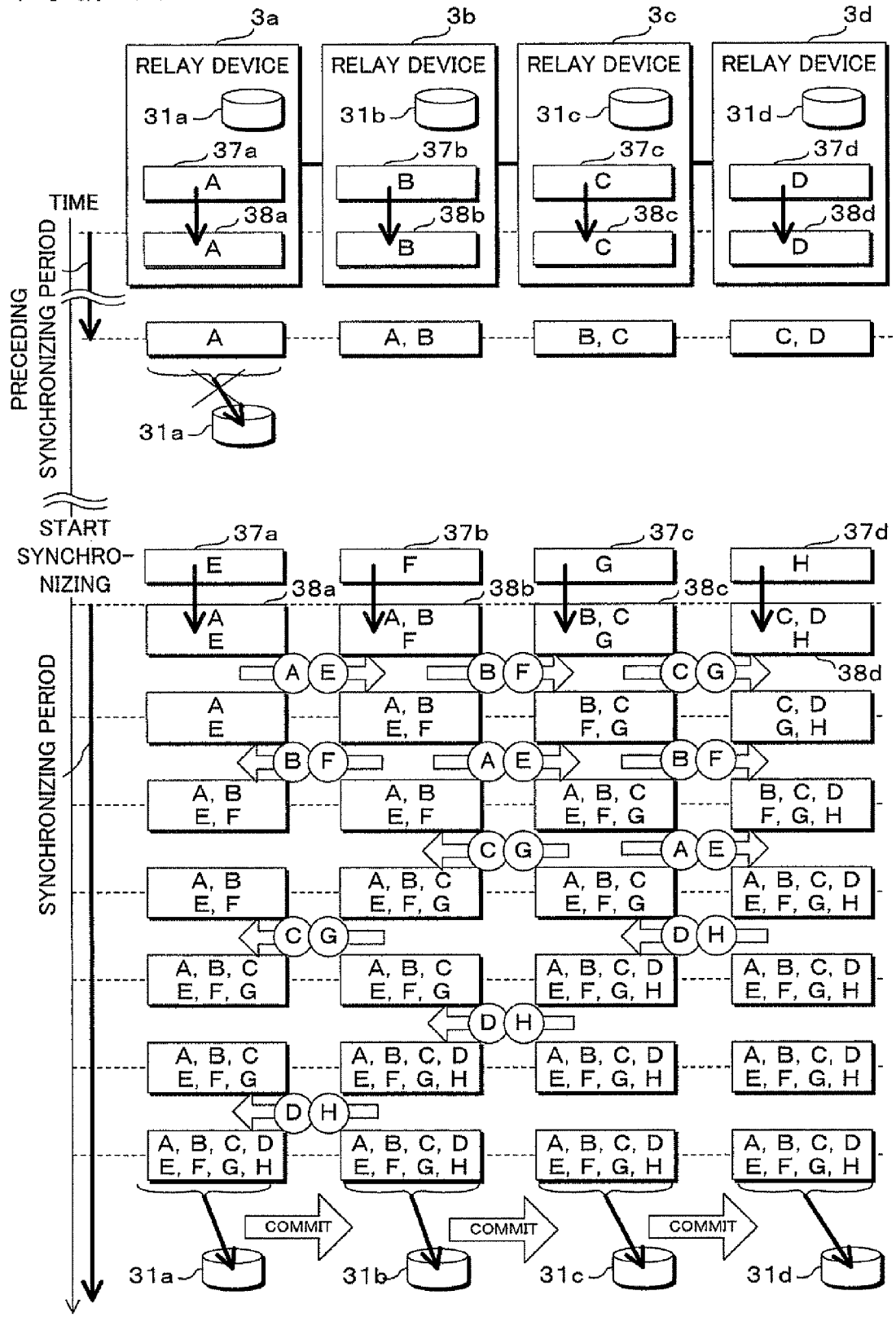
FIG. 17 is an explanatory view schematically illustrating a process of updating databases in relay devices in Embodiment 2 by transmission and reception of mainline frames.

Next, examples of the processing procedure shown in the flowcharts of FIGS. 10 to 16 will be described. FIG. 17 is an explanatory view schematically illustrating a process of updating the databases 31a, 31b, 31c and 31d in the relay devices 3a, 3b, 3c and 3d in Embodiment 2 by transmission and reception of mainline frames. The explanatory view in FIG. 17 shows the process of recovering performed when COMMIT was not issued from the relay device 3a in the preceding synchronizing period.

Since the configuration shown in the explanatory view of FIG. 17 is similar to that in the explanatory view of FIG. 9 in Embodiment 1, detailed description thereof will not be repeated here.

As shown in the flowcharts of FIGS. 10 to 16, in the preceding synchronizing period, the attribute value groups A, B, C and D to be included in the mainline frames are read out from the messages stored in the first reception buffers 37a, 37b, 37c and 37d of the relay devices 3a, 3b, 3c and 3d, respectively, when the synchronizing period arrives. Then, transmission and reception of the mainline frames are performed. If, however, transmission and reception of the mainline frames fail and thus the final frame is not received by the relay device 3a during the synchronizing period, COMMIT is not issued. In such a case, of course, the databases 31a, 31b, 31c and 31d will not be updated.

In the next synchronizing period, the attribute value groups E, F, G and H to be included in the mainline frames are read out from the messages that were stored in the first reception buffers 37a, 37b, 37c and 37d of the relay devices 3a, 3b, 3c and 3d during the preceding synchronizing period, respectively. The relay devices 3a, 3b, 3c and 3d store the carried-over attribute value groups A; A, B; B, C; and C, D. The relay device 3a did not issue COMMIT in the preceding synchronizing period. Therefore, the COMMIT presence/absence information indicating COMMIT absence and the mainline frame including the attribute value group A transmitted the previous time (retransmitted) are transmitted to the relay device 3b together with the mainline frame including the attribute value group E. The relay device 3b deletes the attribute value group A from the carried-over attribute value groups A, B, retrieves the attribute value groups A, E from the freshly-retransmitted mainline frame and the newly-created and transmitted mainline frame, and stores them in the second reception buffer 38b together with the attribute value groups B, F. Likewise, the relay device 3c also deletes the carried-over attribute value group B, retrieves the attribute value groups B, F from the retransmitted mainline frame and the newly-created and transmitted mainline frame, and stores them in the second reception buffer 38c together with the attribute value groups C, G. The same applies to the relay device 3d.

Subsequently, as illustrated in FIG. 17, the mainline frames that were supposed to be transmitted to and received from the relay devices 3a, 3b, 3c and 3d during the preceding synchronizing period are retransmitted. Only after it is confirmed that all the relay devices 3a, 3b, 3c and 3d have received all the mainline frames including retransmitted mainline frames, i.e., after the relay device 3a receives the mainline frame including the attribute value group D (retransmitted) and the newly-created mainline frame including the attribute value group H and issues COMMIT, each of the databases 31a, 31b, 31c and 31d is updated by the attribute value groups A, B, C, D, E, F, G and H. Accordingly, even if transmission and reception of mainline frames among the relay devices 3a, 3b, 3c and 3d fail at some timing, they can recover the subsequent time. Furthermore, the databases 31a, 31b, 31c and 31d remain non-updated until COMMIT is issued again, allowing the contents in the databases 31a, 31b, 31c and 31d to be kept identical.

Figure 18:
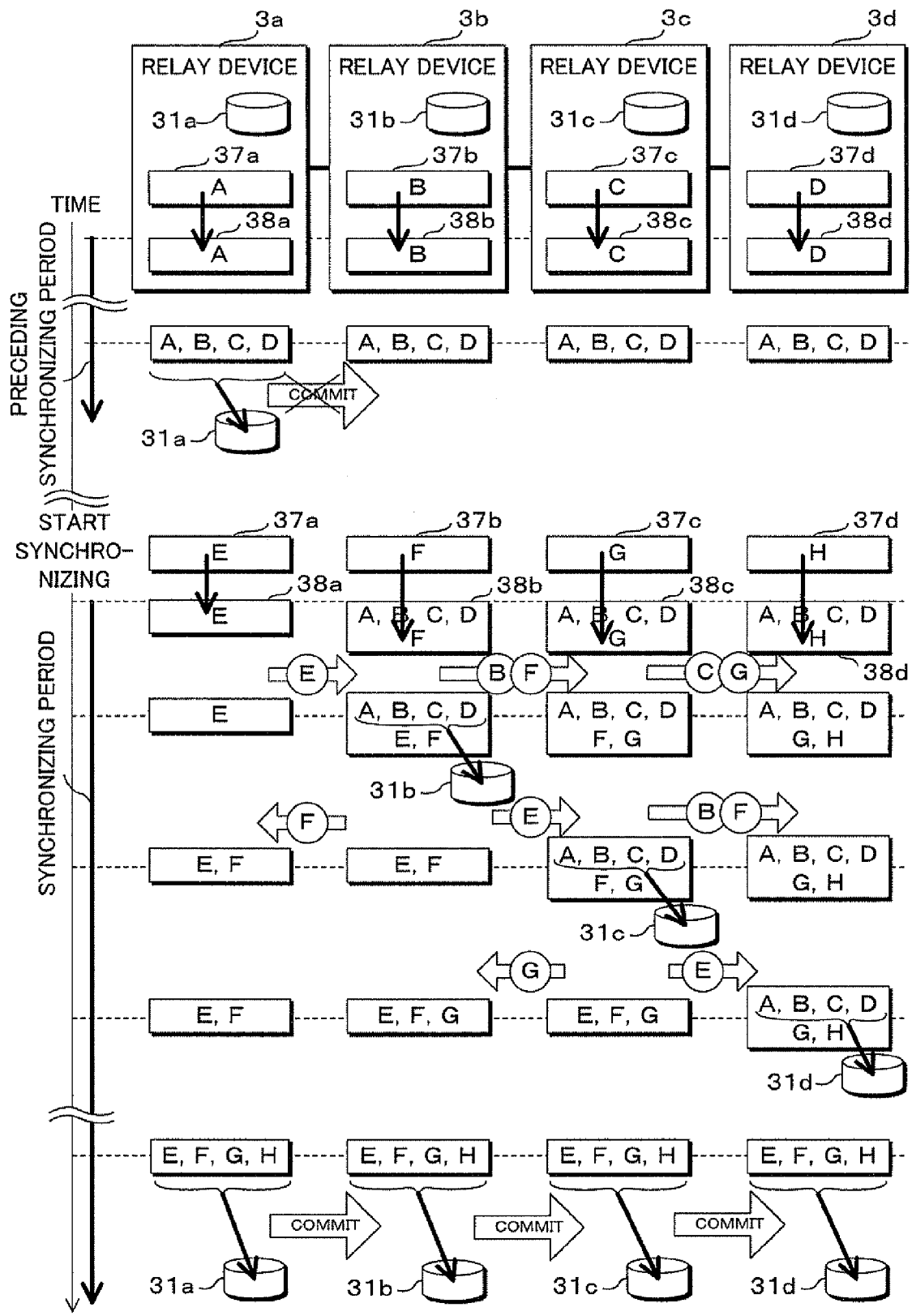
FIG. 18 is an explanatory view schematically illustrating a process of updating databases in relay devices in Embodiment 2 by transmission and reception of mainline frames.

FIG. 18 is an explanatory view schematically illustrating a process of updating the databases 31a, 31b, 31c and 31d in the relay devices 3a, 3b, 3c and 3d in Embodiment 2 by transmission and reception of mainline frames. The explanatory view in FIG. 18 shows the process of recovery performed when COMMIT issued by the relay device 3a was not received by the relay device 3b in the preceding synchronizing period. Since the configuration in the explanatory view of FIG. 18 is similar to that in the explanatory view of FIG. 9 in Embodiment 1, detailed explanation thereof will not be repeated here.

As shown in the flowcharts of FIGS. 10 to 16, in the preceding synchronizing period, the attribute value groups A, B, C and D to be included in the mainline frames are read out from the messages stored in the first reception buffers 37a, 37b, 37c and 37d of the relay devices 3a, 3b, 3c and 3d when the synchronizing period arrives. Then, transmission and reception of the mainline frames are performed. When the final frame from the relay device 3d is received by the relay device 3a, COMMIT is issued while the database 31a is updated by the attribute value groups A, B, C, D. When, however, the relay device 3b could not receive COMMIT issued by the relay device 3a, the database 31b is not updated despite the fact that all the attribute value groups A, B, C, D are stored in the reception buffer 38b. In other relay devices 3c and 3d also, the databases 31c and 31d are not updated despite the fact that all the attribute value groups A, B, C, D are stored in the reception buffers 38c and 38d. In such a case, difference occurs between the contents of the database 31a and the contents of the databases 31b, 31c and 31d.

The processing illustrated in the flowcharts of FIGS. 10 to 16 performed by the relay devices 3a, 3b, 3c and 3d in Embodiment 2 enables early recovery as described below.

In the next synchronizing period, the attribute value groups E, F, G and H to be included in the mainline frames are read out from the messages stored in the first reception buffers 37a, 37b, 37c and 37d of the relay devices 3a, 3b, 3c, and 3d during the preceding synchronizing period, respectively. The relay device 3a stores the information indicating that COMMIT was issued and transmitted the previous time. Therefore, the mainline frame including the attribute value group E is newly transmitted from the relay device 3a. Here, the COMMIT presence/absence information indicating COMMIT presence is also transmitted from the relay device 3a. Hence, the control section 30b in the relay device 3b performs the processing of the steps S71, S72 and S74 among the processing procedures shown in FIG. 14, updating the database 31b with the carried-over attribute value groups A, B, C and D. This allows the database 31b to have the same contents as the database 31a in the relay device 3a.

Likewise, according to the COMMIT presence/absence information indicating COMMIT presence transmitted from the relay device 3a, the control section 30c in the relay device 3c updates the database 31c at the next timing by the carried-over attribute value groups A, B, C and D. This also allows the database 31c to have the same contents as the databases 31a and 31b of the relay devices 3a and 3b. Moreover, at the subsequent timing, the control section 30d in the relay device 3d also updates the database 31d by the carried-over attribute value groups A, B, C and D. Accordingly, even if transmission and reception of COMMIT among the relay devices 31a, 31b, 31c and 31d fail at the end, they can recover as soon as possible, allowing the databases 31a, 31b, 31c and 31d to be kept identical.

In the vehicle-mounted communication system according to Embodiments 1 and 2, examples were described where four relay devices 3a, 3b, 3c and 3d are connected in a daisy-chain form. The present invention, however, is not limited thereto. The number of the relay devices may also be two, three, five or the like instead of four. Moreover, the connection configuration may also be bus or star instead of daisy chain. In such a case also, a specified relay device issues COMMIT indicating necessity of updating of each database in accordance with whether or not the specified relay device has received mainline frames from all the relay devices. To detect any failure of transmission and reception as in the daisy-chain form, change of design is needed in the processing performed by each of the relay devices 3a, 3b, 3c and 3d.

While, for the vehicle-mounted communication system in Embodiments 1 and 2, the configuration is employed in which the control sections 30a, 30b, 30c and 30d of the relay device 3a, 3b, 3c and 3d refer to the correspondence tables 39a, 39b, 39c and 39d, respectively, when they receive mainline frames, it is not limited thereto. It is also possible to determine in advance the number and order of messages included in the mainline frames that are transmitted and received among the relay devices 3a, 3b, 3c and 3d and the combination and order of attribute values in the messages for each relay device. The relay device receiving a mainline frame may then specify the relay device which transmitted the mainline frame to accurately read out an attribute value.

Embodiments disclosed herein are to be construed as merely illustrative, but not a limitation of the scope of the present invention in any way. The scope of the present invention is only determined by the claims, not by the description above. It is intended to include all changes within the scope of meaning and contents equivalent to the claims.

The invention claimed is:

1. A relay device which is connected to an external device periodically transmitting and receiving data including numerical information and identification information of the numerical information, and relays transmission and reception of data between external devices, comprising:
    a first communication section for performing transmission and reception of data with the external device;
    a data storage section for storing data;
    a second communication section for communicating with another relay device;
    a first buffer for storing, each time data is received from the external device, numerical information of the received one or more data; and
    a controller for reading out the numerical information stored in said first buffer and creating a data frame including the numerical information for a certain period of time,
    wherein the second communication section transmits the created data frame to another relay device,
    the relay device further comprises a second buffer for storing, when a data frame is received from another relay device, the received data frame or the numerical information included in the data frame,
    said controller updates the numerical information of data stored in the data storage section with the numerical information stored in said first and second buffers,
    said controller judges whether or not a notice of determination indicating determination of data to be stored in the data storage section is received from another relay device, and
    said controller updates the numerical information when it is judged that the notice of determination is received.

2. The relay device according to claim 1, wherein, when it is judged that the notice of determination is not received, said controller updates the numerical information at a time when transmission information indicating that said notice of determination is transmitted is received from another relay device.

3. A relay device which is connected to an external device periodically transmitting and receiving data including numerical information and identification information of the numerical information, and relays transmission and reception of data between external devices, comprising:
    a first communication section for performing transmission and reception of data with the external device;
    a data storage section for storing data;
    a second communication section for communicating with another relay device;
    a first buffer for storing, each time data is received from the external device, numerical information of the received one or more data; and
    a controller for reading out the numerical information stored in said first buffer and creating a data frame including the numerical information for a certain period of time,
    wherein the second communication section transmits the created data frame to another relay device,
    the relay device further comprises a second buffer for storing, when a data frame is received from another relay device, the received data frame or the numerical information included in the data frame,
    said controller judges whether or not data to be stored in the data storage section is to be determined,
    said controller updates, when it is judged that the data is to be determined, the numerical information of data stored in the data storage section with the numerical information stored in said first and second buffers, and
    when said controller judges that the data is to be determined, said second communication section transmits a notice of determination indicating determination of data to another relay device.

4. The relay device according to claim 3, wherein the second communication section transmits, to another relay device, notice information indicating whether or not said notice of determination was transmitted in a preceding period, and
    when said controller judges that the data is to be determined, said second communication section transmits, in a subsequent period to another relay device, notice information indicating that said notice of determination is transmitted.

5. The relay device according to claim 3, wherein when said controller judges that the data is not to be determined, said second communication section transmits, in the subsequent period to another relay device, notice information indicating that said notice of determination is not transmitted, and retransmits a data frame created in the preceding period to another relay device.

6. A relay device which is connected to an external device periodically transmitting and receiving data including numerical information and identification information of the numerical information, and relays transmission and reception of data between external devices, comprising:
    first communication means for performing transmission and reception of data with the external device;
    data storage means for storing data;
    second communication means for communicating with another relay device;

first buffer means for storing, each time data is received from the external device, numerical information of the received one or more data; and means for reading out the numerical information stored in said first buffer means and creating a data frame including the numerical information for a certain period of time, wherein the second communication means transmits the created data frame to another relay device, the relay device further comprises:

second buffer means for storing, when a data frame is received from another relay device, the received data frame or the numerical information included in the data frame;

update means for updating the numerical information of data stored in the data storage means with the numerical information stored in said first and second buffer means; and judgment means for judging whether or not a notice of determination indicating determination of data to be stored in the data storage means is received from another relay device, and said update means updates the numerical information when the judgment means judges that the notice of determination is received.

7. The relay device according to claim 6, wherein, when the judgment means judges that the notice of determination is not received, said update means updates the numerical information at a time when transmission information indicating that said notice of determination is transmitted is received from another relay device.

8. A relay device which is connected to an external device periodically transmitting and receiving data including numerical information and identification information of the numerical information, and relays transmission and reception of data between external devices, comprising:

first communication means for performing transmission and reception of data with the external device;

data storage means for storing data;

second communication means for communicating with another relay device;

first buffer means for storing, each time data is received from the external device, numerical information of the received one or more data; and means for reading out the numerical information stored in said first buffer means and creating a data frame including the numerical information for a certain period of time, wherein the second communication means transmits the created data frame to another relay device, the relay device further comprises:

second buffer means for storing, when a data frame is received from another relay device, the received data frame or the numerical information included in the data frame;

judgment means for judging whether or not data to be stored in the data storage means is to be determined; and update means for updating, when said judgment means judges that the data is to be determined, the numerical information of data stored in the data storage means with the numerical information stored in said first and second buffer means, and when said judgment means judges that the data is to be determined, said second communication means transmits a notice of determination indicating determination of data to another relay device.

9. The relay device according to claim 8, wherein the second communication means transmits, to another relay device, notice information indicating whether or not said notice of determination was transmitted in a preceding period, and when said judgment means judges that the data is to be determined, said second communication means transmits, in a subsequent period to another relay device, notice information indicating that said notice of determination is transmitted.

10. The relay device according to claim 8, wherein when said judgment means judges that the data is not to be determined, said second communication means transmits, in the subsequent period to another relay device, notice information indicating that said notice of determination is not transmitted, and retransmits a data frame created in the preceding period to another relay device.

11. A communication system, comprising:

a plurality of communication device groups each constructed by a plurality of communication devices periodically transmitting and receiving data including numerical information and identification information of the numerical information; and a plurality of relay devices connected with each other to relay transmission and reception of data among the communication devices, one or more of the relay devices being connected to each of the plurality of communication device groups, wherein each of the relay devices includes:

a first communication section for performing transmission and reception of data with the communication device;

a data storage section for storing data;

a second communication section for communicating with another relay device;

a first buffer for storing, each time data is received from the communication device connected to the relay device, numerical information of the received one or more data; and a controller for reading out the numerical information stored in said first buffer and creating a data frame including the numerical information for a certain period of time, the second communication section transmits the created data frame to another relay device, each relay device further includes a second buffer for storing, when a data frame is received from another relay device, the received data frame or numerical information included in the data frame, the controller updates numerical information of data stored in the data storage section with numerical information stored in said first and second buffers, the controller of a specified relay device in the relay devices judges whether or not data to be stored in the data storage section is to be determined, when the controller judges that the data is to be determined, said second communication section of the specified relay device transmits a notice of determination indicating determination of data to another relay device, when it is judged that the data is to be determined, said controller of the specified relay device updates the numerical information, the controller of the relay device other than said specified relay device judges whether or not said notice of determination is received from the specified relay device, and the controller of the relay device other than said specified relay device updates the numerical information when it is judged that the notice of determination is received.

12. The communication system according to claim 11, wherein
the relay devices are connected in series, and
said specified relay device is a relay device located at one end in the relay devices.

13. The communication system according to claim 12, wherein
the relay device located at an end in the relay devices opposite from said specified relay device waits transmission of the created data frame until data frames transmitted from all the other relay devices are received, and
when said second communication section of the other relay device receives a data frame from one of the neighboring relay devices, said second communication section transfers the data frame to another one of the neighboring relay devices.

14. The communication system according to claim 12, wherein the controller of the specified relay device judges that data is to be determined, when data frames are received from all the other relay devices.

15. A communication system, comprising:
a plurality of communication device groups each constructed by a plurality of communication devices periodically transmitting and receiving data including numerical information and identification information of the numerical information; and
a plurality of relay devices connected with each other to relay transmission and reception of data among the communication devices, one or more of the relay devices being connected to each of the plurality of communication device groups,
wherein each of the relay devices includes:
first communication means for performing transmission and reception of data with the communication device;
data storage means for storing data;
second communication means for communicating with another relay device;
first buffer means for storing, each time data is received from the communication device connected to the relay device, numerical information of the received one or more data; and
means for reading out the numerical information stored in said first buffer means and creating a data frame including the numerical information for a certain period of time,
the second communication means transmits the created data frame to another relay device,
each relay device further includes:
second buffer means for storing, when a data frame is received from another relay device, the received data frame or numerical information included in the data frame; and
update means for updating numerical information of data stored in the data storage means with numerical information stored in said first and second buffer means,
a specified relay device in the relay devices further includes
first judgment means for judging whether or not data to be stored in the data storage means is to be determined,
when the first judgment means judges that the data is to be determined, said second communication means of the specified relay device transmits a notice of determination indicating determination of data to another relay device, when said first judgment means judges that the data is to be determined, said update means of the specified relay device updates the numerical information,
the relay device other than said specified relay device further includes second judgment means for judging whether or not said notice of determination is received from the specified relay device, and
said update means of the relay device other than said specified relay device updates the numerical information when the second judgment means judges that the notice of determination is received.

16. The communication system according to claim 15, wherein
the relay devices are connected in series, and
said specified relay device is a relay device located at one end in the relay devices.

17. The communication system according to claim 16, wherein
the relay device located at an end in the relay devices opposite from said specified relay device waits transmission of the created data frame until data frames transmitted from all the other relay devices are received, and
when said second communication means of the other relay device receives a data frame from one of the neighboring relay devices, said second communication means transfers the data frame to another one of the neighboring relay devices.

18. The communication system according to claim 16, wherein the first judgment means judges that data is to be determined, when data frames are received from all the other relay devices.

19. A communication method to be performed by a plurality of relay devices connected with each other, one or more of the relay devices being connected to each of a plurality of communication device groups constructed by a plurality of communication devices periodically transmitting and receiving data including numerical information and identification information of the numerical information, each of the relay devices receiving data from the communication device, storing data in a data storage section, transmitting data read out from said data storage section to the communication device to relay transmission and reception of data between the communication devices, wherein
each of the relay devices stores, each time data is received from the communication device connected to the relay device, numerical information of the received one or more data in a first buffer;
reads out the numerical information stored in said first buffer and creates a data frame including the numerical information for a certain period of time;
transmits the created data frame to another relay device;
receives a data frame transmitted from another relay device; and
stores the received data frame or numerical information included in the data frame in a second buffer,
a specified relay device in the relay devices judges whether or not data to be stored in the data storage section is to be determined;
transmits a notice of determination indicating determination of data to another relay device when it is judged that the data is to be determined; and
updates numerical information of data in the data storage section with the numerical information in said first and second buffers when it is judged that the data is to be determined, the relay device other than said specified relay device judges whether or not said notice of determination is received from the specified relay device; and updates numerical information of data in the data storage section with the numerical information in said first and second buffers when it is judged that the notice of determination is received.

* * * * *